United States Patent
Chen et al.

(10) Patent No.: US 10,135,359 B2
(45) Date of Patent: Nov. 20, 2018

(54) HYBRID FULL BRIDGE-VOLTAGE DOUBLER RECTIFIER AND SINGLE STAGE LLC CONVERTER THEREOF

(71) Applicants: Yang Chen, Kingston (CA); Hongliang Wang, Hefei (CN); Yan-Fei Liu, Kingston (CA); Zhanming Li, West Vancouver (CA); Yue Fu, Coquitlam (CA)

(72) Inventors: Yang Chen, Kingston (CA); Hongliang Wang, Hefei (CN); Yan-Fei Liu, Kingston (CA); Zhanming Li, West Vancouver (CA); Yue Fu, Coquitlam (CA)

( * ) Notice: Subject to any disclaimer, the term of this patent is extended or adjusted under 35 U.S.C. 154(b) by 0 days.

(21) Appl. No.: 15/962,102

(22) Filed: Apr. 25, 2018

(65) Prior Publication Data

US 2018/0241318 A1   Aug. 23, 2018

Related U.S. Application Data

(63) Continuation of application No. 15/885,941, filed on Feb. 1, 2018.

(60) Provisional application No. 62/458,649, filed on Feb. 14, 2017.

(51) Int. Cl.
| | |
|---|---|
| *H02M 7/219* | (2006.01) |
| *H02M 7/25* | (2006.01) |
| *H02M 7/217* | (2006.01) |
| *H02M 1/42* | (2007.01) |
| *H02M 3/335* | (2006.01) |

(52) U.S. Cl.
CPC .......... *H02M 7/219* (2013.01); *H02M 1/4233* (2013.01); *H02M 1/4241* (2013.01); *H02M 3/3353* (2013.01); *H02M 3/33592* (2013.01)

(58) Field of Classification Search
CPC .......... H02M 7/219; H02M 7/25; H02M 1/08; H02M 1/4233; H02M 1/4241; H02M 3/3353; H02M 3/33592; H02M 7/2176
See application file for complete search history.

(56) References Cited

U.S. PATENT DOCUMENTS

| | | | | |
|---|---|---|---|---|
| 6,147,882 | A * | 11/2000 | Huber | H02M 1/10 363/143 |
| 9,252,654 | B1 * | 2/2016 | Tomioka | H02M 1/4225 |
| 2006/0007717 | A1 * | 1/2006 | Lindemann | H02M 7/1557 363/125 |
| 2016/0359427 | A1 * | 12/2016 | Ghosh | H02M 7/217 |
| 2017/0317582 | A1 * | 11/2017 | Leong | H02M 1/14 |
| 2017/0317594 | A1 * | 11/2017 | Lind | H02M 1/36 |

(Continued)

Primary Examiner — Timothy J Dole
Assistant Examiner — Sisay G Tiku

(57) ABSTRACT

A hybrid rectifier that works as either a hybrid full bridge or a voltage doubler. Under 220 V AC input condition, the hybrid rectifier operates in full bridge mode, while at 110 V AC input, it operates as voltage doubler rectifier. The hybrid rectifier may be used with a DC-DC converter, such as an LLC resonant converter, in a power supply. With this mode switching, the LLC converter resonant tank design only takes consideration of 220 V AC input case, such that the required operational input voltage range is reduced, and the efficiency of the LLC converter is optimized. Both the size and power loss are reduced by using a single stage structure instead of the conventional two-stage configuration.

22 Claims, 22 Drawing Sheets

(56) References Cited

U.S. PATENT DOCUMENTS

2018/0159380 A1* 6/2018 Ii ............................ H02J 50/12
2018/0234028 A1* 8/2018 Chen ..................... H02M 7/219

* cited by examiner

HYBRID FULL BRIDGE-VOLTAGE DOUBLER RECTIFIER AND SINGLE STAGE LLC CONVERTER THEREOF

RELATED APPLICATION

This application is a continuation of application Ser. No. 15/885,941, filed Feb. 1, 2018, and claims the benefit of the filing date of Application No. 62/458,649, filed on Feb. 14, 2017, the contents of which are incorporated herein by reference in their entirety.

FIELD

The invention relates to power converters, and more particularly to rectifiers and AC-DC power adapters.

BACKGROUND

Demand is ever increasing for AC-DC power adapters with high efficiency and high power density, especially where portable devices such as laptop computers are to be more affordable and portable. Compared with a flyback converter, LLC topology is gaining favor due to the proved higher efficiency. Previous studies of the LLC-based power adapter were focused on 90 W-130 W power design, in which two-stage configuration was prevailing to satisfy both Power Factor Correction (PFC) and the DC-DC conversion requirements. Due to improved semiconductor fabrication processes, CPUs now consume less power, and the design of power adapters has been reduced to 45 W-65 W. Within such power range, power factor is no longer a mandatory requirement, thus it is possible to remove the PFC stage.

For portable devices such as laptop computers, the AC-DC adapter is preferably designed to be a universal AC input adapted. Conventionally, a full bridge (FB) diode rectifier with a DC link capacitor is used as the rectification stage between the grid and the LLC converter. However, in order to operate from 90 V AC to 264 V AC, very high DC voltage gain is required for the LLC converter, and such design will degrade the efficiency. To reduce the required operational input voltage range, a hybrid full bridge voltage doubler (FB-VD) rectifier may be used (FIG. 1). The design uses the full bridge rectifier for 220 V AC input, while the voltage doubler rectifier is used for 110 V AC input. However, the switch count is high and switch stress is high for conventional single stage FB-VD rectifiers as shown in FIG. 1. Also, the driving scheme is complicated.

SUMMARY

To solve the above problems, provided in the invention are hybrid FB-VD rectifiers that may be used with DC-DC converters to achieve high efficiency, small size, and light weight, in a power adapter. Accordingly, such power adapters are particularly suitable for use with portable devices such as laptop computers, tablets, and cell phones. According to the embodiments, the hybrid FB-VD rectifier works as a full bridge rectifier for 220 V AC input, while and as a voltage doubler rectifier for 110 V AC input. Embodiments automatically switch between full bridge and voltage doubler operation to accommodate different AC input conditions.

According to a first aspect of the invention, there is provided a first hybrid FB-VD rectifier.

The first hybrid FB-VD rectifier has two input terminals and two output terminals. Two capacitors connected in serial are connected between the two output terminals.

For the two input terminals and two output terminals, the first hybrid FB-VD rectifier provides at least two working modes under 110V AC input. One is just conducting the branch from a first input terminal to a first output terminal and the branch between the connection common point of two capacitors and a second input terminal. At the same time, a first capacitor is charged and a second capacitor is discharged. The other is just conducting the branch between the connection common point of two capacitors and the second input terminal as well as the branch from a second output terminal to the first input terminal. At the same time, the first capacitor is discharged and the second capacitor is charged.

For the two input terminals and two output terminals, the first hybrid FB-VD rectifier provides at least four working modes under 220V AC input. (1) The branch from the first input terminal to the first output terminal is conducted. At the same time, both the branch from the second output terminal to the connection common point of two capacitors and the one from the connection common point of two capacitors to the second input terminal are conducted. The first capacitor is charged and the second capacitor doesn't work. (2) The branch from the second output terminal to the connection common point of two capacitors is conducted. The first capacitor is discharged and the second capacitor isn't working. (3) The branch from the second input terminal to the first output terminal is conducted. At the same time, the branch from the second output terminal to the first input terminal is conducted. Both the first capacitor and the second capacitor are charged. (4) All the branches excluding the two capacitors are not conducted. Both the first capacitor and the second capacitor are discharged.

In some embodiments, the first hybrid FB-VD rectifier comprises four diodes, one switch and two capacitors.

The positive terminal of a first diode is connected to both the negative terminal of a second diode and the first input terminal. The negative terminal of the first diode is connected to both the negative terminal of a third diode and the positive terminal of the first capacitor. The positive terminal of the third diode is connected to both the second input terminal and the first terminal of the switch. The positive terminal of the second diode is connected to both the positive terminal of a fourth diode and the negative terminal of the second capacitor. The negative terminal of the fourth diode is connected to the second terminal of the switch. The positive terminal of the first capacitor is connected to the first output terminal and its negative terminal is connected to both the positive terminal of the second capacitor and negative terminal of the fourth diode. The negative terminal of the second capacitor is connected to the second output terminal.

According to a second aspect of the invention, there is provided a first single stage LLC converter which comprises the hybrid FB-VD rectifier provided in the first aspect of the invention and LLC converter. The output terminals of the hybrid FB-VD rectifier are connected to the LLC converter.

According to a third aspect of the invention, there is provided a second hybrid FB-VD rectifier.

The second hybrid FB-VD rectifier has two input terminals and two output terminals. It comprises three capacitors and a third capacitor is connected between the two output terminals.

For the two input terminals and two output terminals, the second hybrid FB-VD rectifier provides at least three working modes under 110V AC input. (1) The branch from a first input terminal to a first output terminal is conducted. At the same time, the branch between the first output terminal and a second input terminal is conducted through a first capacitor, and the branch between a second output terminal and the second input terminal is conducted through a second capacitor. The first and the third capacitors are charged, and the second capacitor is discharged. (2) The branch between the second input terminal and the first output terminal is conducted through the first capacitor. At the same time, the branch between the second input terminal and the first input terminal is conducted through the second capacitor and the second output terminal. The second and the third capacitors are charged, and the first capacitor is discharged. (3) The branch between the second output terminal and the first output terminal is conducted through both the first capacitor and the second capacitor. All the three capacitors are discharged.

For the two input terminals and two output terminals, the second hybrid FB-VD rectifier provides at least two working modes under 220V AC input. (1) The branch from the first input terminal to the first output terminal is conducted. At the same time, the branch from the second output terminal to the second input terminal is conducted. The first capacitor and the second capacitor don't work, and the third capacitor is charged. (2) The branch from the second input terminal to the first output terminal is conducted. At the same time, the branch from the second output terminal to the first input terminal is conducted. The first capacitor and the second capacitor don't work, and the third capacitor is charged.

In some embodiments, the second hybrid FB-VD rectifier comprises four diodes, two switches and three capacitors.

The positive terminal of a first diode is connected to both the negative terminal of a second diode and the first input terminal. The negative terminal of the first diode is connected to both the negative terminal of a third diode and the positive terminal of the first capacitor. The positive terminal of the third diode is connected to both the second input terminal and the second terminal of the first switch. The positive terminal of the second diode is connected to both the positive terminal of a fourth diode and the second terminal of the second switch. The negative terminal of the fourth diode is connected to the positive terminal of the third diode. The negative terminal of the first capacitor is connected to the first terminal of the first switch whose second terminal is connected to the positive terminal of the second capacitor. The negative terminal of the second capacitor is connected to the first terminal of the second switch. The positive terminal of the third capacitor is connected to both the first output terminal and the positive terminal of the first capacitor, and the negative terminal of the third capacitor is connected to both the second output terminal and the second terminal of the second switch.

According to a fourth aspect of the invention, there is provided a second single stage LLC converter which comprises the hybrid FB-VD rectifier provided in the third aspect of the invention and LLC converter. The output terminals of the hybrid FB-VD rectifier are connected to the LLC converter.

The hybrid rectifier provided in the invention works as full bridge rectifier for 220 V AC, while the voltage doubler rectifier for 110 V AC. Thus, ideally the resonant tank design of the LLC converter only considers 220 V AC input case, and the required DC gain will be reduced to a great extent for the single stage LLC converter with the hybrid rectifier. Compared with the conventional FB-VD rectifier in the present single stage LLC converter, it has advantages of fewer switch number, reduced switch stress, and simplified driving scheme. Most importantly, the conduction loss in the switches is reduced.

The single stage LLC converter provided in the invention can be used for power adapter of low-power electronic supplies, such as laptops.

According to another aspect of the invention, there is provided a hybrid FB-VD rectifier, comprising: first and second AC input terminals; first and second DC output terminals; a plurality of diodes; one switch having a first terminal connected to the second AC input terminal; first and second capacitors connected in series between the first and second output terminals, a common point between the first and second capacitors being connected to a second terminal of the switch, the second capacitor being connected in parallel with one of the diodes; wherein the hybrid FB-VD rectifier operates according to at least first and second working modes corresponding to positive and negative portions, respectively, of a low AC input voltage, the first working mode including the switch conducting in a first direction, the first capacitor charging, and the second capacitor discharging to supply a load, and the second working mode including the switch conducting in a second direction, the second capacitor charging, and the first capacitor discharging to supply the load; wherein, for a high AC input voltage, the switch is not active and only a body diode of the switch conducts during a positive half cycle of the high AC input voltage to charge the first capacitor; wherein the high AC input voltage is twice the low AC input voltage.

In one embodiment the low AC input voltage is an AC utility of about 90-150 V AC, and the high AC input voltage is an AC utility of about 200-280 V AC.

In one embodiment the hybrid FB-VD rectifier comprises first, second, third, and fourth diodes; wherein a positive terminal of the first diode is connected to both a negative terminal of the second diode and the first input terminal; a negative terminal of the first diode is connected to both a negative terminal of a third diode and a positive terminal of the first capacitor; a positive terminal of the third diode is connected to both the second input terminal and the first terminal of the switch; a positive terminal of the second diode is connected to both a positive terminal of the fourth diode and a negative terminal of the second capacitor; a negative terminal of the fourth diode is connected to the second terminal of the switch; a positive terminal of the first capacitor is connected to the first output terminal and a negative terminal of the first capacitor is connected to both a positive terminal of the second capacitor and a negative terminal of the fourth diode; a negative terminal of the second capacitor is connected to the second output terminal.

In one embodiment the first capacitor is a 400 V rating capacitor and the second capacitor is a 200 V rating capacitor.

In one embodiment the first capacitor and the second capacitor are of the same value in μF.

In one embodiment the first capacitor and the second capacitor are 68 μF.

In one embodiment the first, second, third, and fourth diodes are 600 V, 1 A and the switch is a 650 V, 190 mOhm MOSFET.

Another aspect of the invention relates to a power supply comprising a hybrid FB-VD rectifier as described above, and a DC-DC converter. The DC-DC converter may be a LLC resonant converter, LCLC resonant converter, LCC resonant converter, series resonant converter (SRC), parallel resonant converter (PRC), flyback converter or forward converter. The LLC converter may be a single stage LLC converter comprising a transformer with a turns ratio often.

In one embodiment the low AC input voltage is an AC utility of about 90-150 V AC, and the high AC input voltage is an AC utility of about 200-280 V AC.

Another aspect of the invention relates to a method of implementing a hybrid FB-VD rectifier, comprising: providing, for the hybrid FB-VD rectifier: first and second AC input terminals; first and second DC output terminals; a plurality of diodes; one switch having a first terminal connected to the second AC input terminal; first and second capacitors connected in series between the first and second output terminals, a common point between the first and second capacitors being connected to a second terminal of the switch, the second capacitor being connected in parallel with one of the diodes; the method further comprising: operating the hybrid FB-VD rectifier according to at least first and second working modes corresponding to positive and negative portions, respectively, of a low AC input voltage, the first working mode including the switch conducting in a first direction, the first capacitor charging, and the second capacitor discharging to supply a load, and the second working mode including the switch conducting in a second direction, the second capacitor charging, and the first capacitor discharging to supply the load; and operating the hybrid FB-VD rectifier such that, for a high AC input voltage, the switch is not active and only a body diode of the switch conducts during a positive half cycle of the high AC input voltage to charge the first capacitor.

In one embodiment the low AC input voltage is an AC utility of about 90-150 V AC, and the high AC input voltage is an AC utility of about 200-280 V AC.

In one embodiment the method comprises implementing the hybrid FB-VD rectifier using first, second, third, and fourth diodes; wherein a positive terminal of the first diode is connected to both a negative terminal of the second diode and the first input terminal; a negative terminal of the first diode is connected to both a negative terminal of a third diode and a positive terminal of the first capacitor; a positive terminal of the third diode is connected to both the second input terminal and the first terminal of the switch; a positive terminal of the second diode is connected to both a positive terminal of the fourth diode and a negative terminal of the second capacitor; a negative terminal of the fourth diode is connected to the second terminal of the switch; a positive terminal of the first capacitor is connected to the first output terminal and a negative terminal of the first capacitor is connected to both a positive terminal of the second capacitor and a negative terminal of the fourth diode; a negative terminal of the second capacitor is connected to the second output terminal.

In one embodiment the first capacitor is a 400 V rating capacitor and the second capacitor is a 200 V rating capacitor.

In one embodiment the first capacitor and the second capacitor are of the same value in µF.

In one embodiment the first capacitor and the second capacitor are 68 µF.

In one embodiment the first, second, third, and fourth diodes are 600 V, 1 A and the switch is a 650 V, 190 mOhm MOSFET.

The method may comprise implementing the hybrid FB-VD rectifier together with a DC-DC converter in a power supply. The DC-DC converter may be a LLC resonant converter, LCLC resonant converter, LCC resonant converter, series resonant converter (SRC), parallel resonant converter (PRC), flyback converter or forward converter.

The LLC converter may be a single stage LLC converter comprising a transformer with a turns ratio of ten.

In one embodiment the low AC input voltage is an AC utility of about 90-150 V AC, and the high AC input voltage is an AC utility of about 200-280 V AC.

According to another aspect of the invention, there is provided a FB-VD rectifier, comprising: first and second AC input terminals; first and second DC output terminals; a plurality of diodes; a first switch connected in series with a first capacitor; a second switch connected in series with a second capacitor; a third capacitor connected between the first and second DC output terminals; wherein, for a low AC input voltage, the hybrid FB-VD rectifier operates according to at least first, second, and third working modes, the first working mode corresponding to a positive half cycle of the AC input voltage and including the first switch conducting to charge the first capacitor and the second switch conducting to charge third capacitor, and the second capacitor discharging; the second working mode corresponding to a negative half cycle of the AC input voltage and including the second switch conducting to charge the second capacitor and the first switch conducting to charge third capacitor, and the first capacitor discharging; and the third working mode including the first and second switches conducting and the first, second, and third capacitors discharging; wherein, for a high AC input voltage, the first switch and the second switch are not active and only the third capacitor is charged and discharged.

In one embodiment the low AC input voltage is an AC utility of about 90-150 V AC, and the high AC input voltage is an AC utility of about 200-280 V AC.

In one embodiment the FB-VD rectifier comprises first, second, third, and fourth diodes; wherein a positive terminal of the first diode is connected to both a negative terminal of the second diode and the first input terminal; a negative terminal of the first diode is connected to both a negative terminal of the third diode and a positive terminal of the first capacitor; a positive terminal of the third diode is connected to both the second input terminal and a second terminal of the first switch; a positive terminal of the second diode is connected to both a positive terminal of the fourth diode and a second terminal of the second switch; a negative terminal of the fourth diode is connected to the positive terminal of the third diode; a negative terminal of the first capacitor is connected to a first terminal of the first switch; a second terminal of the first switch is connected to a positive terminal of the second capacitor; a negative terminal of the second capacitor is connected to a first terminal of the second switch; a positive terminal of the third capacitor is connected to both the first output terminal and a positive terminal of the first capacitor, and a negative terminal of the third capacitor is connected to both the second output terminal and the second terminal of the second switch.

In one embodiment the first capacitor and the second capacitor are 200 V rating capacitors and the third capacitor is a 400 V rating capacitor.

In one embodiment the first capacitor and the second capacitor are of the same value in µF.

In one embodiment the first capacitor and the second capacitor are 47 µF and the third capacitor is 22 µF.

In one embodiment the first, second, third, and fourth diodes are 600 V, 1 A and the first and second switches are 650 V, 190 mOhm MOSFETs.

Another aspect of the invention relates to a power supply comprising a hybrid FB-VD rectifier as described above, and a DC-DC converter. The DC-DC converter may be a LLC resonant converter, LCLC resonant converter, LCC resonant converter, series resonant converter (SRC), parallel resonant converter (PRC), flyback converter or forward converter. The LLC converter may be a single stage LLC converter comprising a transformer with a turns ratio of ten.

In one embodiment the low AC input voltage is an AC utility of about 90-150 V AC, and the high AC input voltage is an AC utility of about 200-280 V AC.

According to another aspect of the invention there is provided a method for implementing a hybrid FB-VD rectifier, comprising providing, for the hybrid FB-VD rectifier: first and second AC input terminals; first and second DC output terminals; a plurality of diodes; a first switch connected in series with a first capacitor; a second switch connected in series with a second capacitor; a third capacitor connected between the first and second DC output terminals; the method further comprising: for a low AC input voltage, operating the hybrid FB-VD rectifier according to at least first, second, and third working modes, the first working mode corresponding to a positive half cycle of the AC input voltage and including the first switch conducting to charge the first capacitor and the second switch conducting to charge third capacitor, and the second capacitor discharging; the second working mode corresponding to a negative half cycle of the AC input voltage and including the second switch conducting to charge the second capacitor and the first switch conducting to charge third capacitor, and the first capacitor discharging; and the third working mode including the first and second switches conducting and the first, second, and third capacitors discharging; for a high AC input voltage, operating the hybrid FB-VD rectifier such that the first switch and the second switch are not active and only the third capacitor is charged and discharged.

In one embodiment, the low AC input voltage is an AC utility of about 90-150 V AC, and the high AC input voltage is an AC utility of about 200-280 V AC.

In one embodiment, the method may comprise implementing the hybrid FB-VD rectifier using first, second, third, and fourth diodes; wherein a positive terminal of the first diode is connected to both a negative terminal of the second diode and the first input terminal; a negative terminal of the first diode is connected to both a negative terminal of the third diode and a positive terminal of the first capacitor; a positive terminal of the third diode is connected to both the second input terminal and a second terminal of the first switch; a positive terminal of the second diode is connected to both a positive terminal of the fourth diode and a second terminal of the second switch; a negative terminal of the fourth diode is connected to the positive terminal of the third diode; a negative terminal of the first capacitor is connected to a first terminal of the first switch; a second terminal of the first switch is connected to a positive terminal of the second capacitor; a negative terminal of the second capacitor is connected to a first terminal of the second switch; a positive terminal of the third capacitor is connected to both the first output terminal and a positive terminal of the first capacitor, and a negative terminal of the third capacitor is connected to both the second output terminal and the second terminal of the second switch.

In one embodiment, the first capacitor and the second capacitor are 200 V rating capacitors and the third capacitor is a 400 V rating capacitor.

In one embodiment, the first capacitor and the second capacitor are of the same value in µF.

In one embodiment, the first capacitor and the second capacitor are 47 µF and the third capacitor is 22 µF.

In one embodiment, the first, second, third, and fourth diodes are 600 V, 1 A and the first and second switches are 650 V, 190 mOhm MOSFETs.

The method may comprise implementing the hybrid FB-VD rectifier together with a DC-DC converter in a power supply. The DC-DC converter may be a LLC resonant converter, LCLC resonant converter, LCC resonant converter, series resonant converter (SRC), parallel resonant converter (PRC), flyback converter or forward converter. The LLC converter may be a single stage LLC converter comprising a transformer with a turns ratio of ten.

In one embodiment the low AC input voltage is an AC utility of about 90-150 V AC, and the high AC input voltage is an AC utility of about 200-280 V AC.

According to another aspect of the invention, provided are controllers for controlling switches of the FB-VD rectifier embodiments, and optionally also for controlling switches of the DC-DC converters.

BRIEF DESCRIPTION OF THE DRAWINGS

For a better understanding of the invention, and to show more clearly how it may be carried into effect, embodiments will be described in detail with reference of the accompanying drawings, wherein.

DETAILED DESCRIPTION OF EMBODIMENTS

Figure 1:
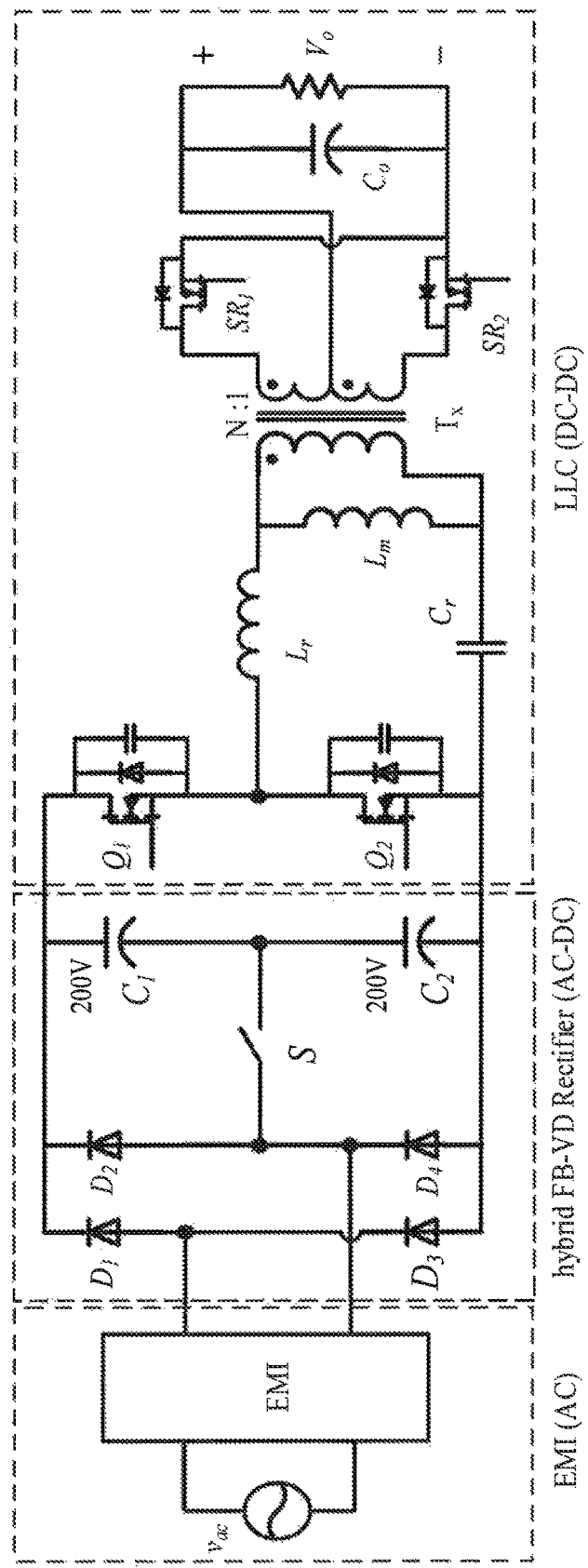
FIG. 1 is a circuit diagram of a single stage LLC converter with a FB-VD rectifier, according to the prior art.

For the purpose of this description, a diode will be used as a non-limiting example for all elements characterized by single direction conduction. The positive terminal of a diode is referred to the anode and the negative terminal is the cathode. It will be understood that other suitable devices may be used for the elements in the embodiments.

For the purpose of this description, "switch" is intended to refer to a switch where the current can flow in both directions and withstand voltage in one direction, such as IGBT with a parallel diode, or MOSFET where the parallel diode is inherent.

For the purpose of this description, a MOSFET will be used as a non-limiting example for all the switches characterized by controllable conduction in the invention. For an N-channel MOSFET, for example, the first terminal is the drain, the second terminal is the source and the control terminal is the gate. The control terminal of each switch in the embodiments described herein is provided with its own control signal. However, it will be understood that other suitable devices, such as IGBT, TRIAC, mechanical or solid state relay may be used for the switches characterized by controllable conduction in the embodiments.

To ensure the current in a circuit branch including a switch may flow in both directions, the switch may be reversely connected in parallel with a diode. For example, in a MOSFET, if the current direction is from the drain to the source, the current is denoted as a positive current. If the current direction is from the source to drain, i.e., the current is negative, the current might flow in the MOSFET channel or the parallel diode. Because of the opposite current direction, the parallel diode is sometimes called reverse diode.

Throughout this description, the terms "first", "second", and so on are used to distinguish elements or operations from one another, and not to indicate a specific relationship or sequence among them.

Embodiments described herein relate to hybrid FB-VD rectifiers and single stage DC-DC converters incorporating the FB-VD rectifiers. Examples of suitable converters include, but are not limited to, LLC resonant converter, LCLC resonant converter, LCC resonant converter, series resonant converter (SRC), parallel resonant converter (PRC), flyback converter, forward converter, etc. Whereas embodiments are described with single stage LLC converters, it will be appreciated that the invention is not limited thereto. The embodiments operate at two AC voltage input levels, which may be referred to as a low AC input voltage and a high AC input voltage, wherein, in some embodiments, the high AC input voltage may be double the low AC input voltage. Typical examples are about 110-130 V AC for the low AC input voltage and about 220-260 V AC for the high AC input voltage, although other voltage ranges are possible, such as, for example, 90-150 V AC and 200-280 V AC. Throughout this description, 110 V AC and 220 V AC will be used as the low and high AC voltages, as a practical application, but it will be appreciated that the embodiments are not limited thereto.

A hybrid FB-VD rectifier according to the embodiments works as a full bridge rectifier for 220 V AC input, and as a voltage doubler rectifier for 110 V AC input. It automatically switches between full bridge and voltage doubler configuration to accommodate different AC input voltage ranges. Embodiments may be used in many applications where AC-DC power conversion is required. However, embodiments may be particularly useful in AC-DC power adapters for portable devices such as smart phones, tablets, and laptop computers, due to their high efficiency and the compact size and light weight that may be achieved in practical implementations.

Embodiments will be described in detail with reference of the accompanying drawings.

Figure 2:
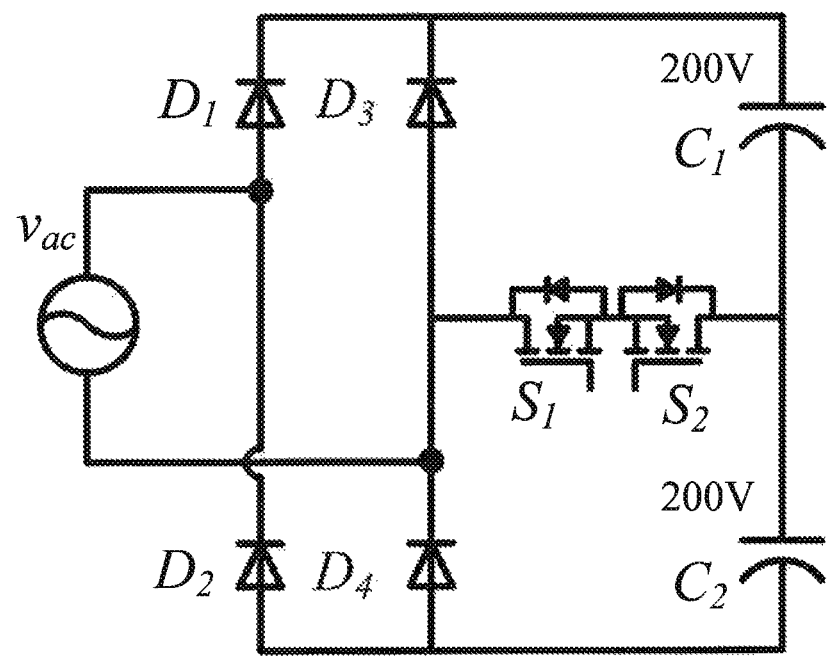
FIG. 2 is a circuit diagram of a conventional FB-VD rectifier.

FIG. 2 shows the circuit diagram of the conventional FB-VD rectifier. It can be seen from FIG. 2 that it comprises four diodes, two switches, and two capacitors. In a practical application such as operation at 220 V AC input, the two capacitors should be 200 V rating electrolytic capacitors of same capacitor value.

Figure 3A:
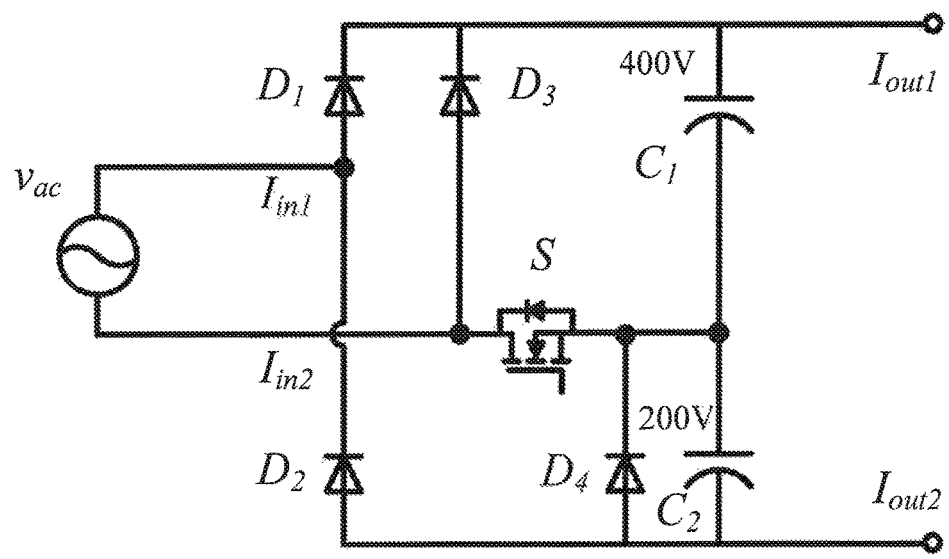
FIG. 3A is a circuit diagram of a FB-VD rectifier #1 according to an embodiment of the invention.

FIG. 3A is a circuit diagram of a hybrid FB-VD rectifier according to an embodiment of the invention. For the sake of brevity, the term "FB-VD rectifier #1" as used herein is intended to refer to this embodiment.

As shown in FIG. 3A, the FB-VD rectifier #1 has two input terminals $I_{in1}$, $I_{in2}$ and two output terminals $I_{out1}$, $I_{out2}$. It comprises four diodes ($D_1$, $D_2$, $D_3$, $D_4$), one switch (S), and two capacitors ($C_1$ and $C_2$).

The positive terminal of the first diode $D_1$ is connected to both the negative terminal of a second diode $D_2$ and the first input terminal $I_{in1}$. The negative terminal of the first diode $D_1$ is connected to both the negative terminal of a third diode $D_3$ and the positive terminal of the first capacitor $C_1$. The positive terminal of the third diode $D_3$ is connected to both the second input terminal $I_{in2}$ and the first terminal of the switch S. The positive terminal of the second diode $D_2$ is connected to both the positive terminal of the fourth diode $D_4$ and the negative terminal of the second capacitor $C_2$. The negative terminal of the fourth diode $D_4$ is connected to the second terminal of the switch S. The positive terminal of the first capacitor $C_1$ is connected to the first output terminal $I_{out1}$ and its negative terminal is connected to both the positive terminal of the second capacitor $C_2$ and negative terminal of the fourth diode $D_4$. The negative terminal of the second capacitor $C_2$ is connected to the second output terminal $I_{out2}$.

In a practical application such as operation at 220 V AC input, the first capacitor $C_1$ should be a 400 V rating electrolytic capacitor and $C_2$ should be a 200 V rating electrolytic capacitor. A 400 V rating capacitor as $C_2$ is used for the 220 V AC case. It can be seen that only one switch (e.g., a MOSFET) is used instead of two in the conventional structure.

When the FB VD rectifier #1 is working in voltage doubler mode at 110 V AC, the conduction loss in the switches will be reduced to half as compared to the conventional structure. Generally, 110 V AC is the worst case in terms of efficiency because the current stress is high. Thus, saving the loss at 110 V AC is very desirable.

Figure 4:
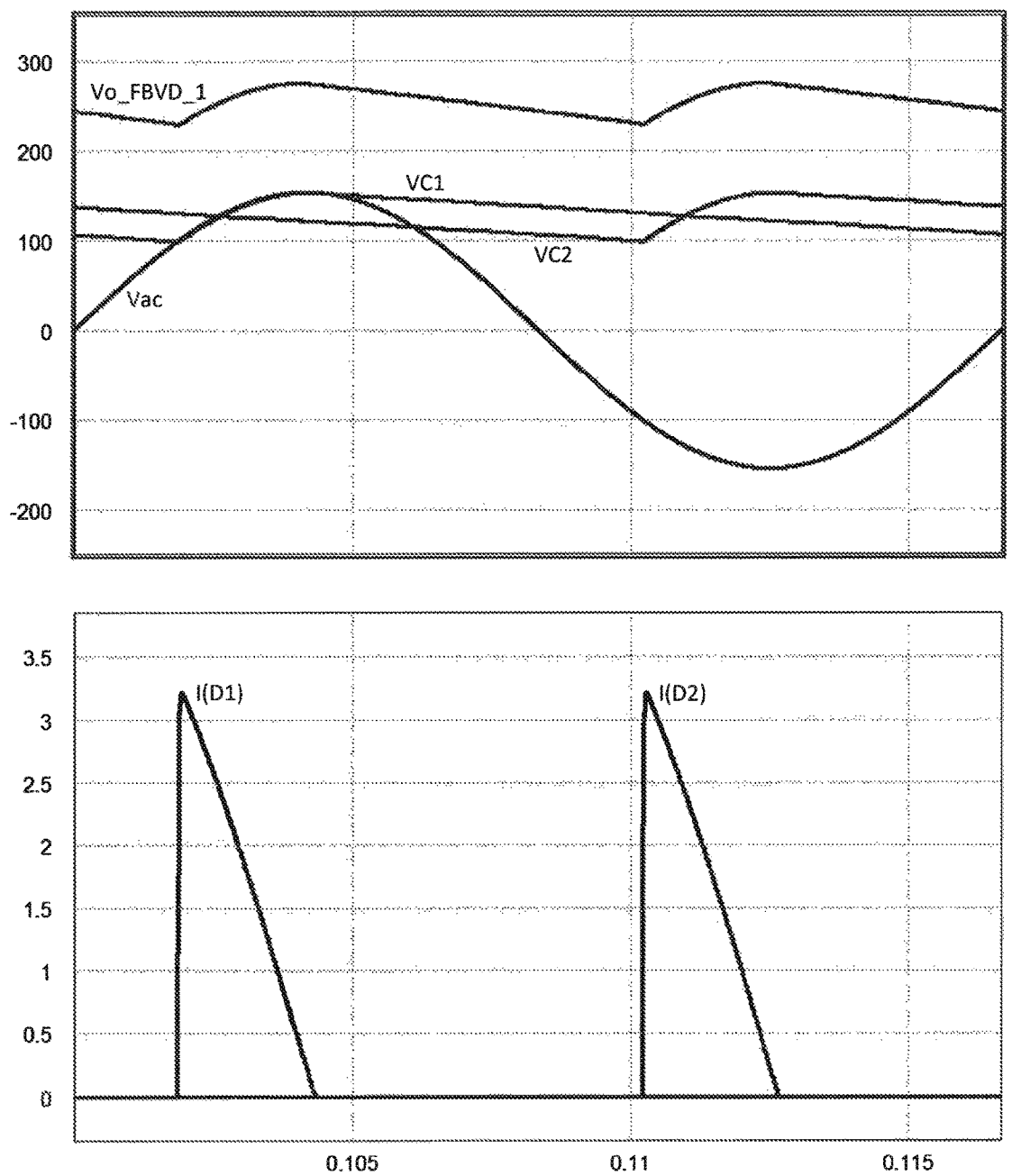
FIG. 4 is shows voltage (upper panel) and current (lower panel) waveforms of the FB-VD rectifier #1 embodiment of FIG. 3A, at 110V AC input.

The waveforms of the FB-VD rectifier #1 at 110 V AC are shown in FIG. 4. Vac is the input voltage; Vo_FBVD_1 is the output voltage of the rectifier; $V_{C1}$ and $V_{C2}$ are the voltage stresses on $C_1$ and $C_2$. $I_{D1}$ and $I_{D2}$ are the current stress in the diodes $D_1$ and $D_2$.

When the input AC voltage is below the output voltage, there is no current in the circuit. The two capacitors $C_1$ and $C_2$ in series discharge to provide power for the load. In the positive half cycle, when the AC voltage magnitude is higher than the $C_1$ voltage, $C_1$ will be charged. In the negative half cycle, when the AC voltage magnitude is higher than the $C_2$ voltage, $C_2$ will be charged. The charging current is approximately equal to the diode input current. An analysis on the charging process is described below during which the input current causes loss in the rectifier.

Figure 5A:
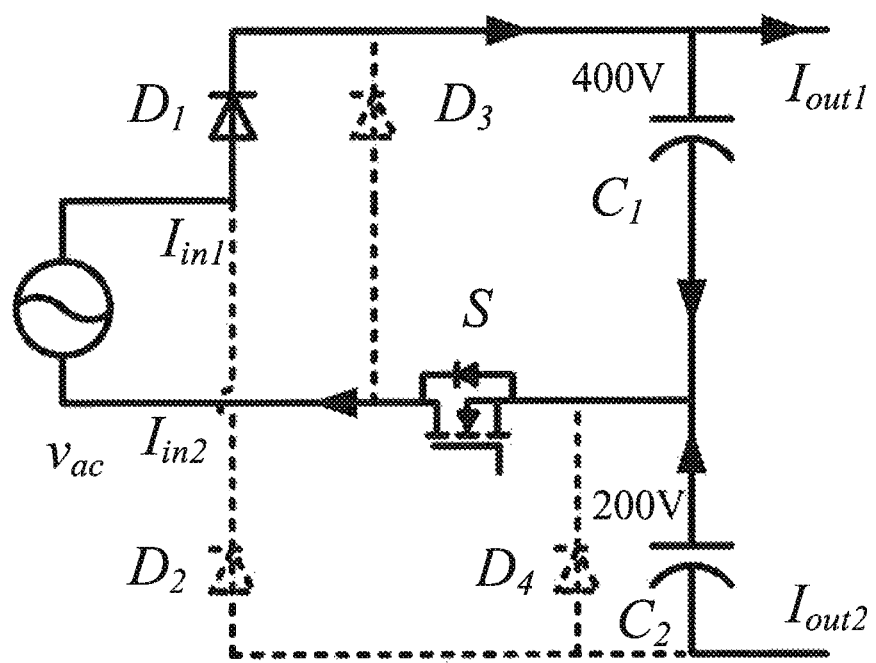
FIG. 5A is an operational mode diagram of the FB-VD rectifier #1 embodiment of FIG. 3A at 110V AC input during the positive half cycle of the input voltage.
Figure 5B:
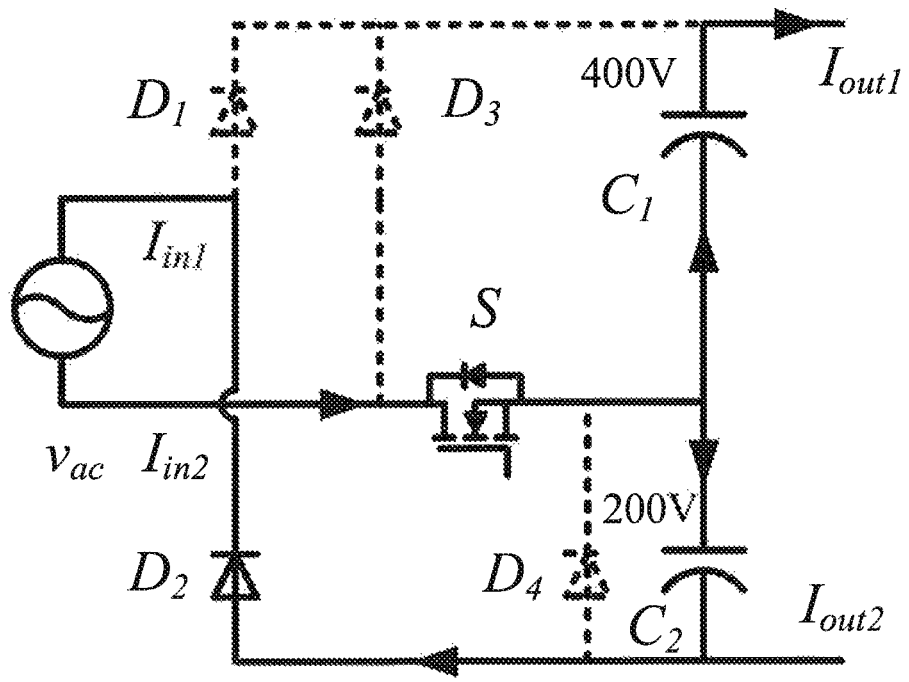
FIG. 5B is an operational mode diagram of the FB-VD rectifier #1 embodiment of FIG. 3A at 110V AC input during the negative half cycle of the input voltage.

The charging process of the FB-VD rectifier #1 at 110 V AC is shown in FIGS. 5A and 5B. During the positive half cycle, as shown in FIG. 5A, $D_1$, $C_1$, S conduct, and $C_1$ is charged by the AC source. The charging circuit loop is as follows: $V_{ac} \rightarrow D_1 \rightarrow C_1 \rightarrow S \rightarrow V_{ac}$. It should be noted that, during this process, $C_2$ is not charged, and it is discharging to power the load.

During the negative half cycle, as shown in FIG. 5B, S, $C_2$, $D_2$ conduct, and $C_2$ is charged by the AC source. The charging circuit loop is as follows: $V_{ac} \rightarrow S \rightarrow C_2 \rightarrow D_2 \rightarrow V_{ac}$. During this process, $C_1$ is discharging to power the load.

Figure 6:
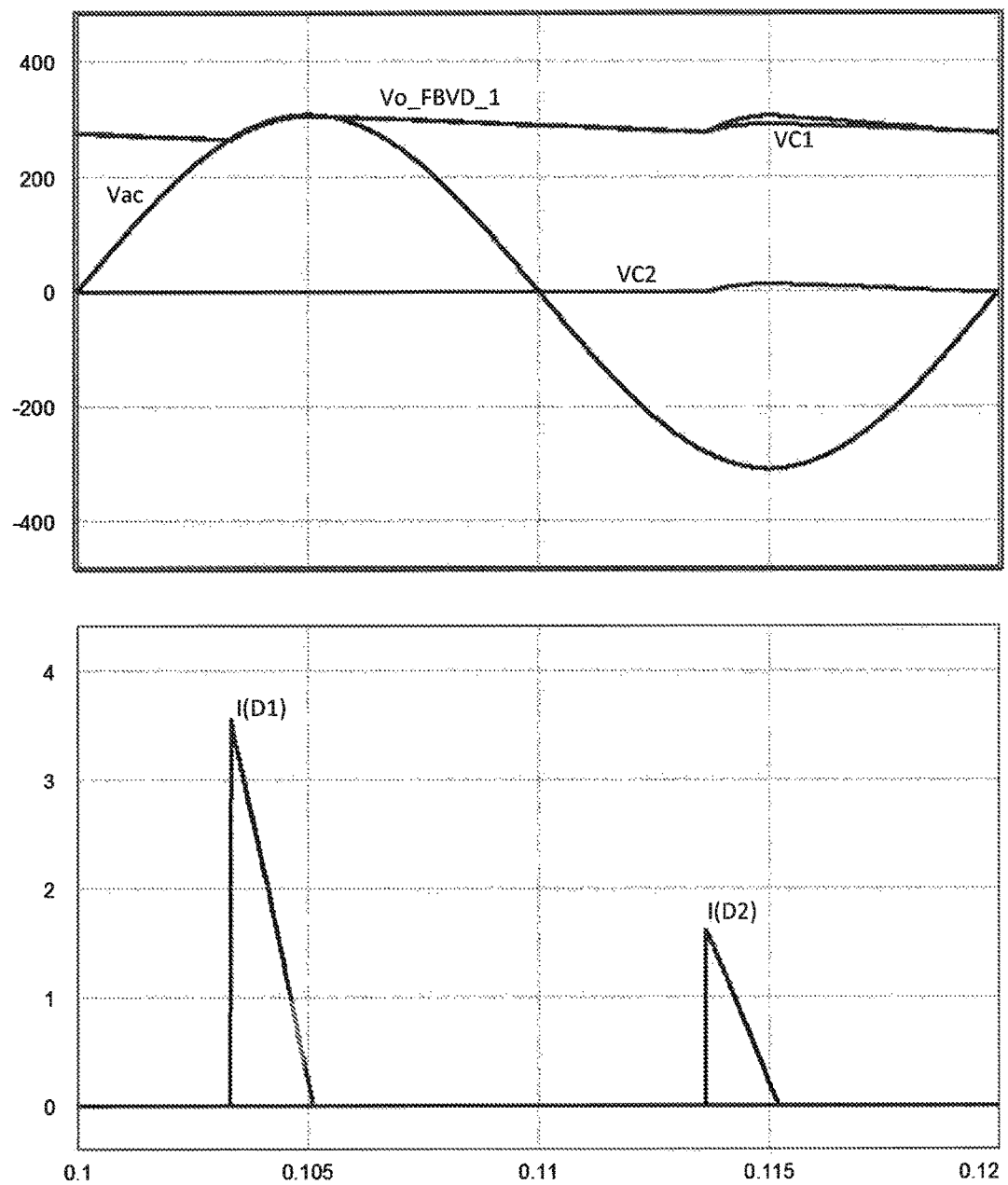
FIG. 6 shows voltage (upper panel) and current (lower panel) waveforms of the FB-VD rectifier #1 embodiment of FIG. 3A at 220V AC input.

FIG. 6 shows the waveforms of the FB-VD rectifier #1 at 220 V AC input. The output of the FB-VD rectifier #1 resembles the full bridge rectifier despite that $C_1$ will be around 400 V, while $C_2$ only slightly participates the power transfer. For the sake of brevity, it is not descried in detail here.

The operational modes of the FB-VD rectifier #1 at 220 V AC are shown in FIGS. 7A-7D.

Figure 7A:
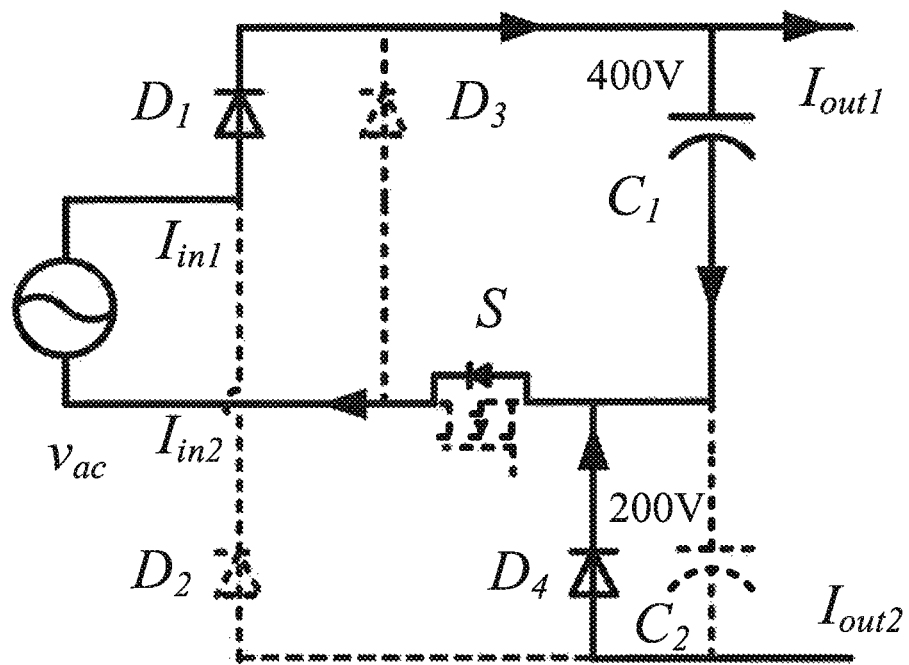
FIG. 7A is an operational mode diagram showing a capacitor charging process for the FB-VD rectifier #1 of FIG. 3A at 220V AC input during the positive half cycle of the input voltage.

The charging process in the positive half cycle is shown in FIG. 7A. $D_1$, $C_1$ and the body diode of S conduct to charge $C_1$ through the circuit loop: $V_{ac} \rightarrow D_1 \rightarrow C_1 \rightarrow S \rightarrow V_{ac}$. However, $C_2$ is not charged due to the lack of charging path. $D_4$ works to power the load, which also clamps $C_2$ to 0 V.

Figure 7B:
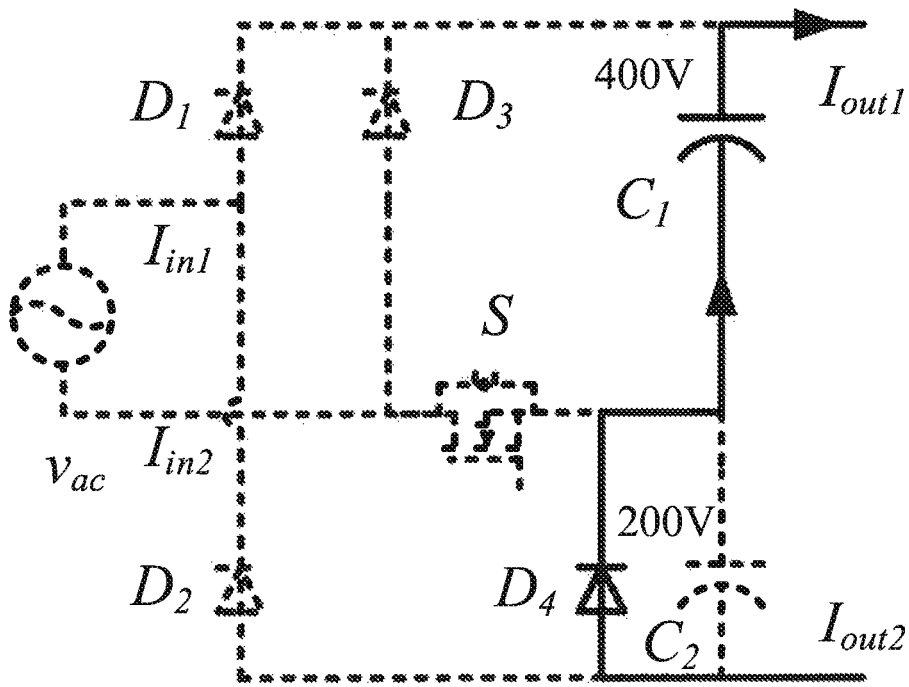
FIG. 7B is an operational mode diagram showing a capacitor discharging process for the FB-VD rectifier #1 of FIG. 3A at 220V AC input during the positive half cycle of the input voltage.

During the discharging process in the positive half cycle, as shown in FIG. 7B, $C_1$ is discharged through $D_4$ to power the load. $C_2$ is still clamped to 0 V.

Figure 7C:
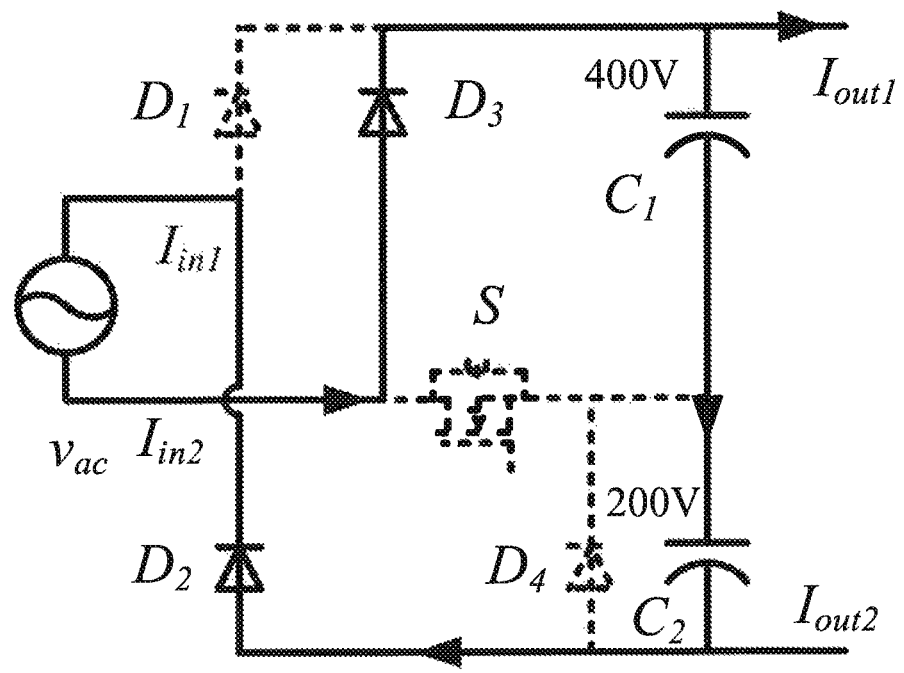
FIG. 7C is an operational mode diagram showing a capacitor charging process for the FB-VD rectifier #1 of FIG. 3A at 220V AC input during the negative half cycle of the input voltage.

FIG. 7C shows the charging process in the negative half cycle. $C_1$ and $C_2$ are both charged together through $D_2$ and $D_3$. The charging circuit loop is as follows: $V_{ac} \rightarrow D_3 \rightarrow C_1 \rightarrow C_2 \rightarrow D_2 \rightarrow V_{ac}$. As the equivalent capacitance of the two capacitors is reduced to only half $C_1$ (or $C_2$), the input current is also reduced to approximately half as compared to the positive half cycle.

Figure 7D:
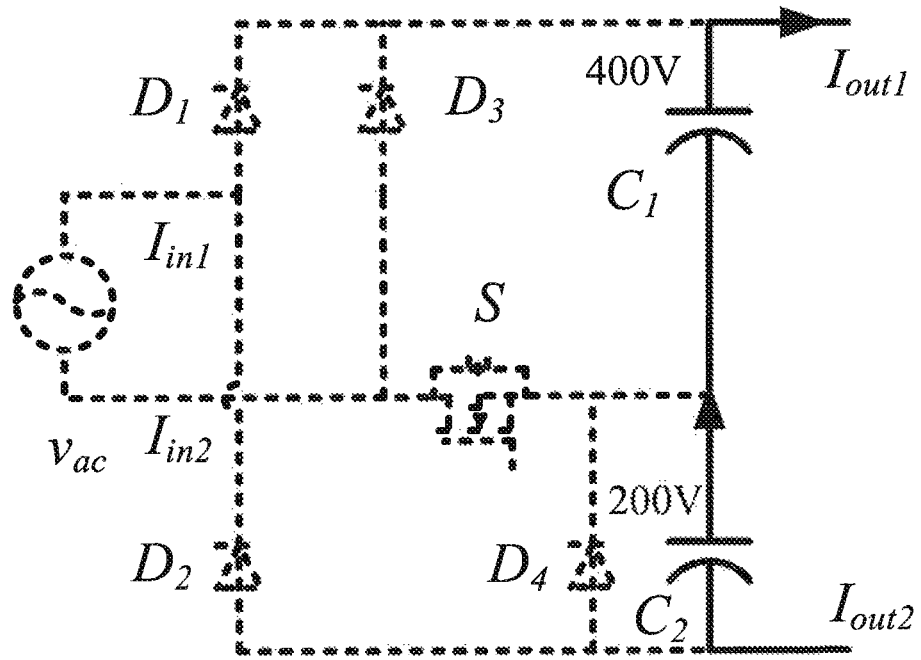
FIG. 7D is an operational mode diagram showing a capacitor discharging process for the FB-VD rectifier #1 of FIG. 3A at 220V AC input during the negative half cycle of the input voltage.

FIG. 7D shows the discharging process in the negative half cycle. As $C_2$ has been charged in the previous stage (FIG. 7C), it also participates the discharging. When $C_2$ voltage reduces to 0 V, then $D_4$ will conduct, and $C_1$ alone provides power to the load. The process is same as that shown in FIG. 7B when $C_2$ voltage reduces to 0 V.

Figure 8A:
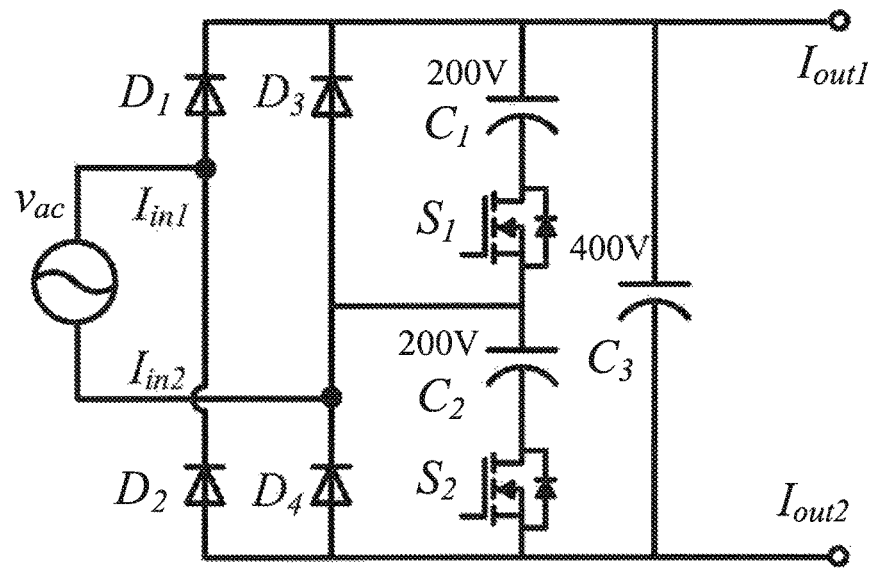
FIG. 8A is a circuit diagram of a FB-VD rectifier #2 according to another embodiment of the invention.

FIG. 8A is a circuit diagram of a second hybrid FB-VD rectifier according to another embodiment of the invention.

As shown in FIG. 8A, the second hybrid FB-VD rectifier has two input terminals $I_{in1}$, $I_{in2}$ and two output terminals $I_{out1}$, $I_{out2}$. It comprises four diodes ($D_1$, $D_2$, $D_3$, $D_4$), two switches ($S_1$ and $S_2$) and three capacitors ($C_1$, $C_2$ and $C_3$). For the sake of brevity, the term "FB-VD rectifier #2" as used herein is intended to refer to the second hybrid FB-VD rectifier embodiment.

The positive terminal of the first diode $D_1$ is connected to both the negative terminal of the second diode $D_2$ and the first input terminal $I_{in1}$. The negative terminal of the first diode $D_1$ is connected to both the negative terminal of the third diode $D_3$ and the positive terminal of the first capacitor $C_1$. The positive terminal of the third diode $D_3$ is connected to both the second input terminal $I_{in2}$ and the second terminal of the first switch $S_1$. The positive terminal of the second diode $D_2$ is connected to both the positive terminal of the fourth diode $D_4$ and the second terminal of the second switch $S_2$. The negative terminal of the fourth diode $D_4$ is connected to the positive terminal of the third diode $D_3$. The negative terminal of the first capacitor $C_1$ is connected to the first terminal of the first switch $S_1$ whose second terminal is connected to the positive terminal of the second capacitor $C_2$. The negative terminal of the second capacitor $C_2$ is connected to the first terminal of the second switch $S_2$. The positive terminal of the third capacitor $C_3$ is connected to both the first output terminal $I_{out1}$ and the positive terminal of the first capacitor $C_1$, and the negative terminal of the third capacitor $C_3$ is connected to both the second output terminal $I_{out2}$ and the second terminal of the second switch $S_2$.

As shown in FIG. 8A, for the FB-VD rectifier #2, two switches $S_1$ and $S_2$ are placed on the capacitor shunt branches instead of the common branch as in the conventional structure (see FIG. 2). Thus, the conduction loss in $S_1$ and $S_2$ is only half as compared to that in the conventional structure. The configuration of the FB-VD rectifier #2 is even more beneficial when thermal characteristics are considered, because the hot spot is split. At 220 V AC operation, $C_1$ and $C_2$ will not be connected.

In a practical application, a 400 V rating capacitor $C_3$ is needed for full bridge mode operation. The value of $C_3$ is small, as the voltage ripple of 220 V AC input is much smaller than the 110 V AC case. When operating at 110 V, $C_1$, $C_2$ and $C_3$ will operate. Thus, the $C_1$ and $C_2$ values can be selected smaller as compared to the conventional structure.

In one embodiment, $C_1$ and $C_2$ capacitance values are chosen as 47 µF at 200 V rating and $C_3$ is chosen as 22 µF at 400 V rating. Thus, the overall size of $C_1$, $C_2$ and $C_3$ is similar to the two 68 µF capacitors at 200 V rating in the conventional FB-VD structure, since the total product of capacitance and rating voltage (simplified as CV) is very close.

Figure 9:
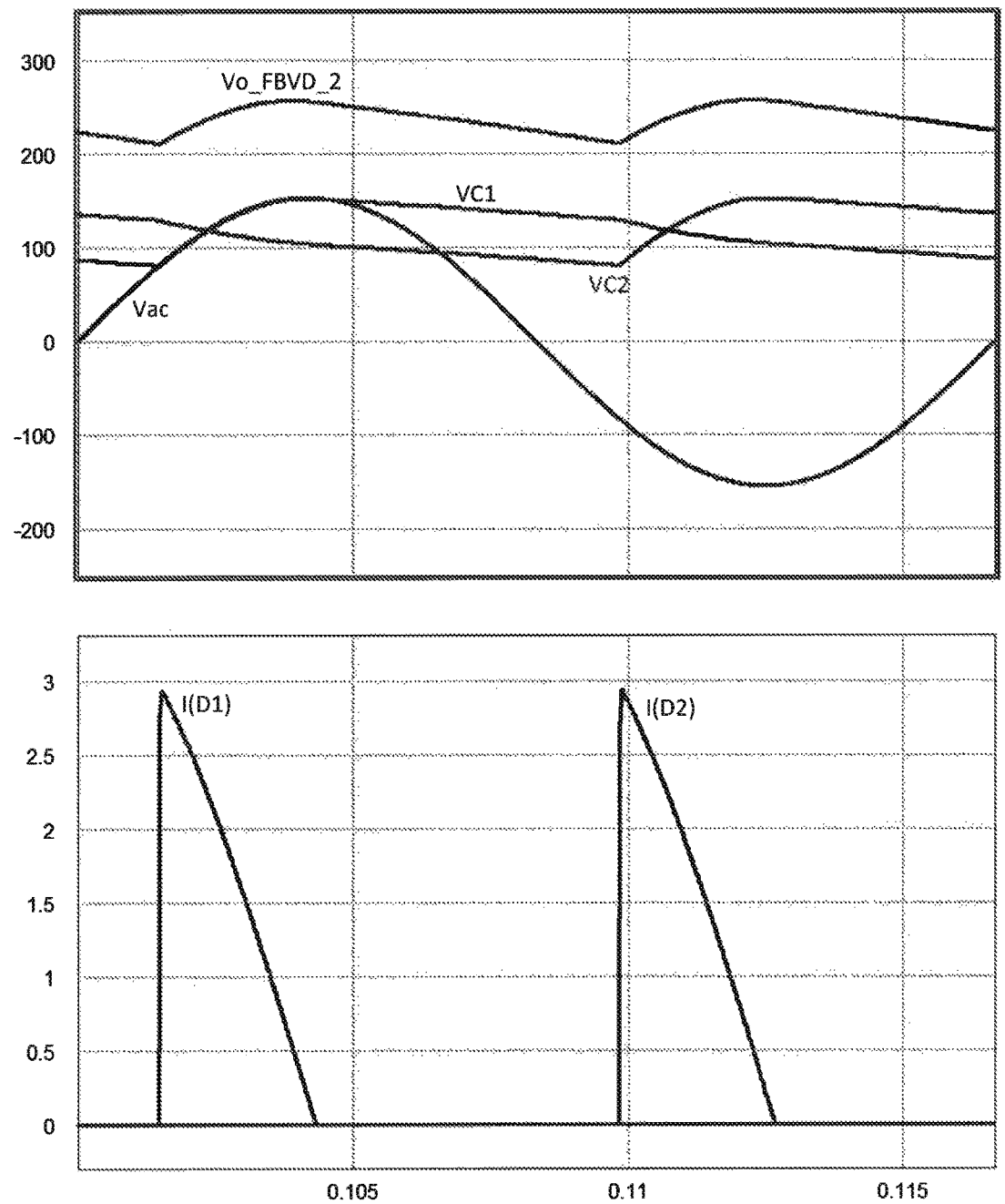
FIG. 9 shows voltage (upper panel) and current (lower panel) waveforms of the FB-VD rectifier #2 embodiment of FIG. 8A at 110V AC input.

The waveforms of the FB-VD rectifier #2 at 110 V AC are shown in FIG. 9. Vac is the input AC voltage at 60 Hz; Vo_FBVD_2 is the output voltage of the rectifier $V_{C1}$ and $V_{C2}$ are the voltages on $C_1$ and $C_2$ respectively, $I_{D1}$ and $I_{D2}$ are respectively the current stress in the diodes $D_1$ and $D_2$.

Figure 10A:
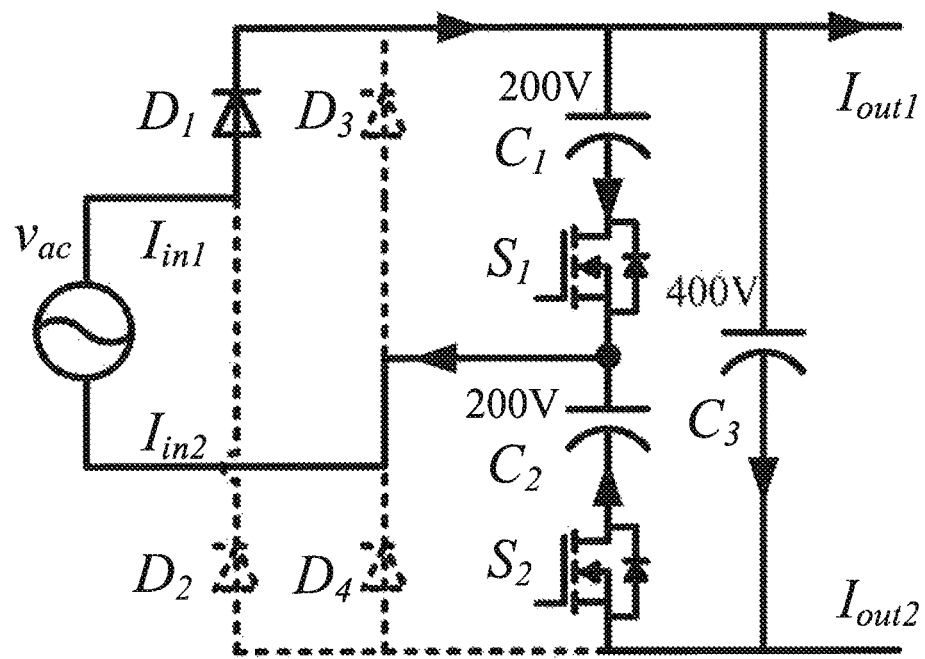
FIG. 10A is a circuit diagram showing a first operational mode of the FB-VD rectifier #2 embodiment of FIG. 8A at 110V AC input.
Figure 10B:
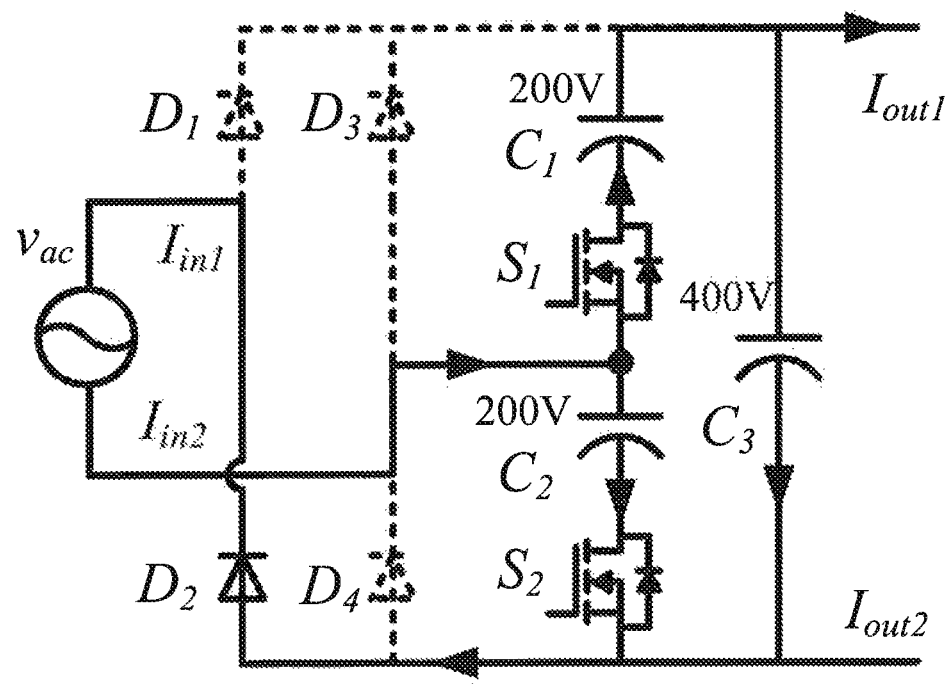
FIG. 10B is a circuit diagram showing a second operational mode of the FB-VD rectifier #2 embodiment of FIG. 8A at 110V AC input.
Figure 10C:
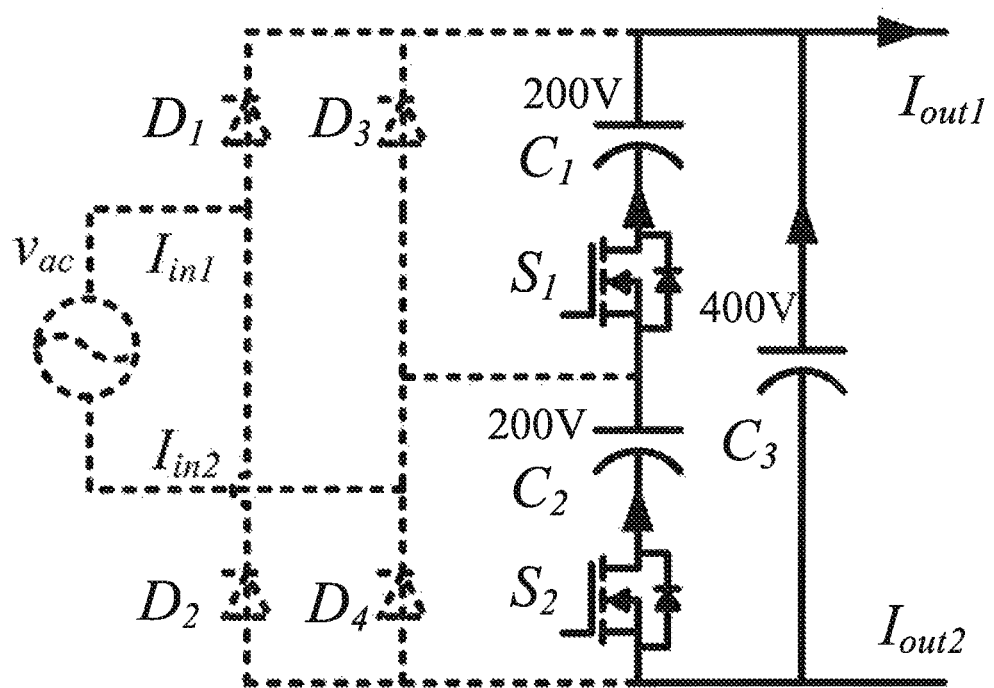
FIG. 10C is a circuit diagram showing a third operational mode of the FB-VD rectifier #2 embodiment of FIG. 8A at 110V AC input.

FIGS. 10A-10C show the operational modes of the FB-VD rectifier #2 at 110 V AC input. During the positive half cycle, as shown in FIG. 10A, $C_1$ is charged through $D_1$ and $S_1$ and the charging circuit loop is $V_{ac} \rightarrow D_1 \rightarrow C_1 \rightarrow S_1 \rightarrow V_{ac}$. $C_3$ is charged through $D_1$ and $S_2$, and the charging circuit loop is $V_{ac} \rightarrow D_1 \rightarrow C_3 \rightarrow S_2 \rightarrow C_2 \rightarrow V_{ac}$. $C_2$ discharges to provide current for both $C_3$ and the load. As can be observed in FIG. 9, there is a small decrease in $V_{C2}$ while $C_1$ is charged.

During the negative half cycle, as shown in FIG. 10B, $C_2$ is charged through $S_2$ and $D_2$, and the charging circuit loop is $V_{ac} \rightarrow C_2 \rightarrow S_2 \rightarrow D_2 \rightarrow V_{ac}$. $C_3$ is charged through S1 and $D_2$, and the charging circuit loop is $V_{ac} \rightarrow S_1 \rightarrow C_1 \rightarrow C_3 \rightarrow D_2 \rightarrow V_{ac}$. $C_1$ discharges to provide current for both $C_3$ and the load.

As shown in FIG. 10C, when the capacitors are not charging, $C_1$ and $C_2$ are connected in series and provide power to the load with $C_3$ in parallel during the positive and negative half cycles.

Figure 11:
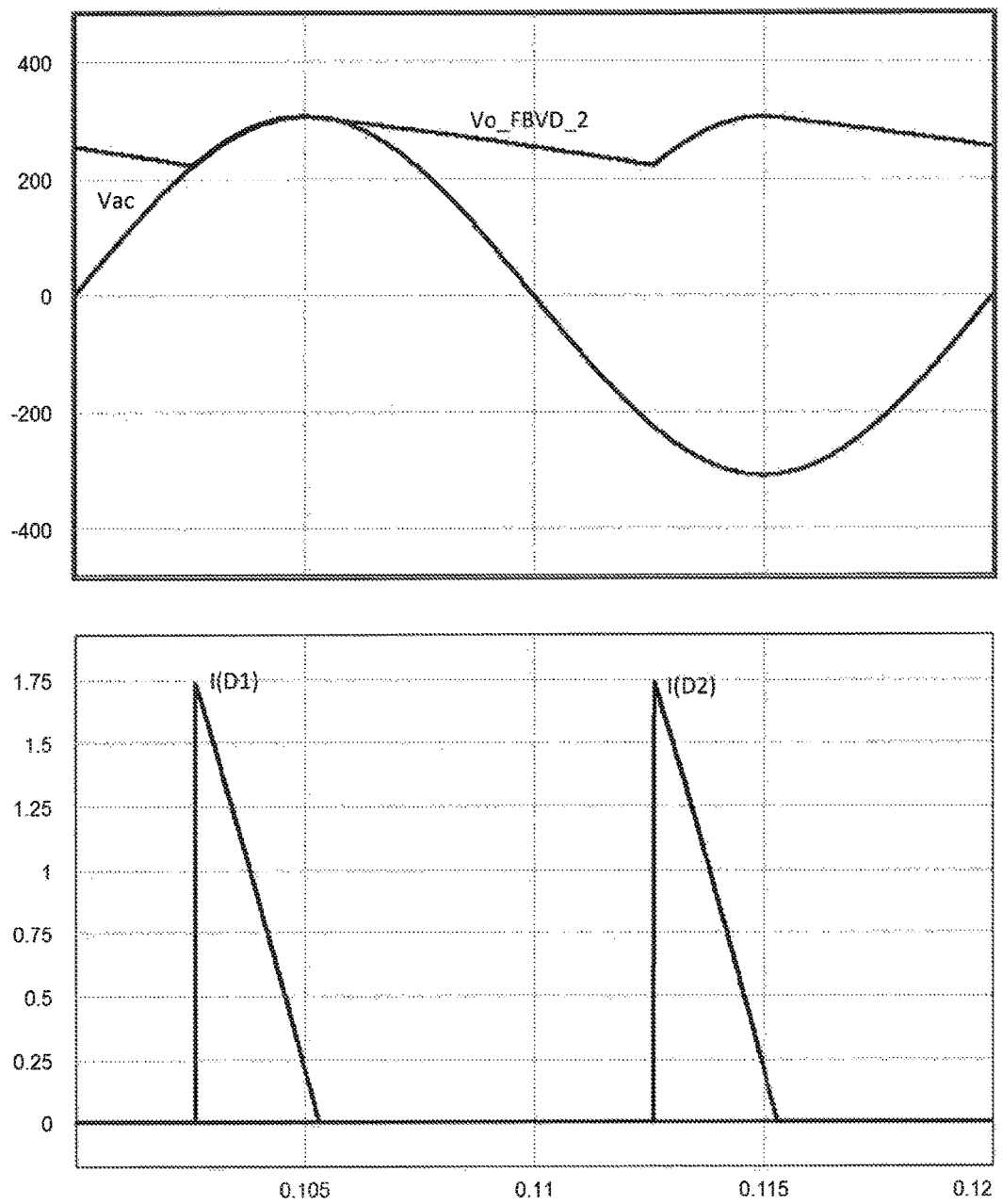
FIG. 11 shows voltage (upper panel) and current (lower panel) waveforms of the FB-VD rectifier #2 embodiment of FIG. 8A at 220V AC input.

FIG. 11 shows the waveforms of the FB-VD rectifier #2 at 220 V AC input. $C_1$, $C_2$, $S_1$ and $S_2$ remain idle at 220 V. $D_1$, $D_2$, $D_3$, $D_4$ and $C_3$ operate as a full bridge rectifier.

Figure 12A:
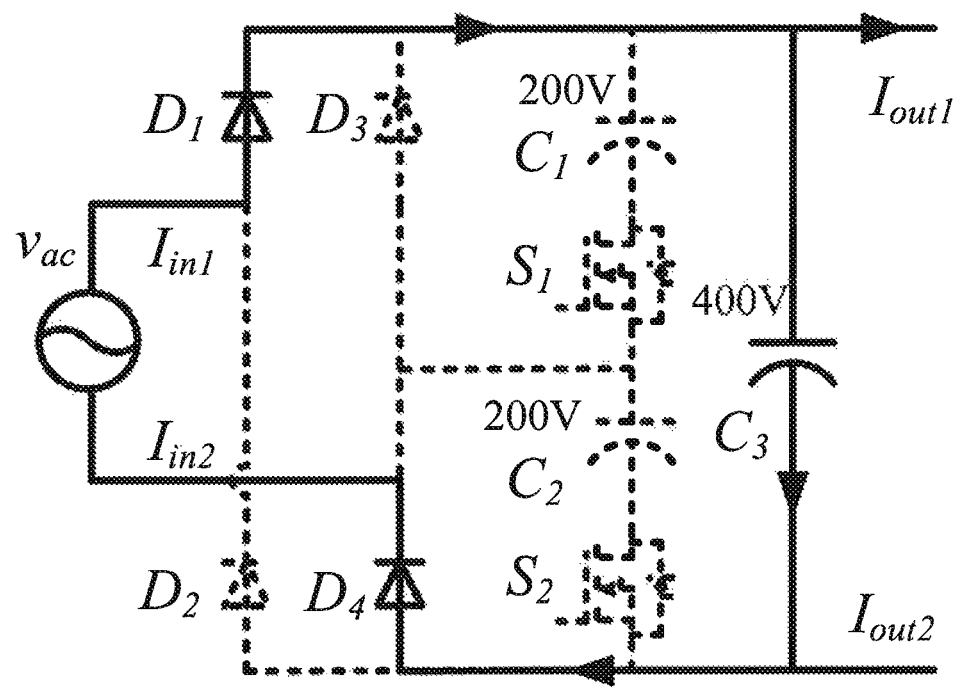
FIG. 12A is a circuit diagram showing a first operational mode of the FB-VD rectifier #2 embodiment of FIG. 8A at 220V AC input.
Figure 12B:
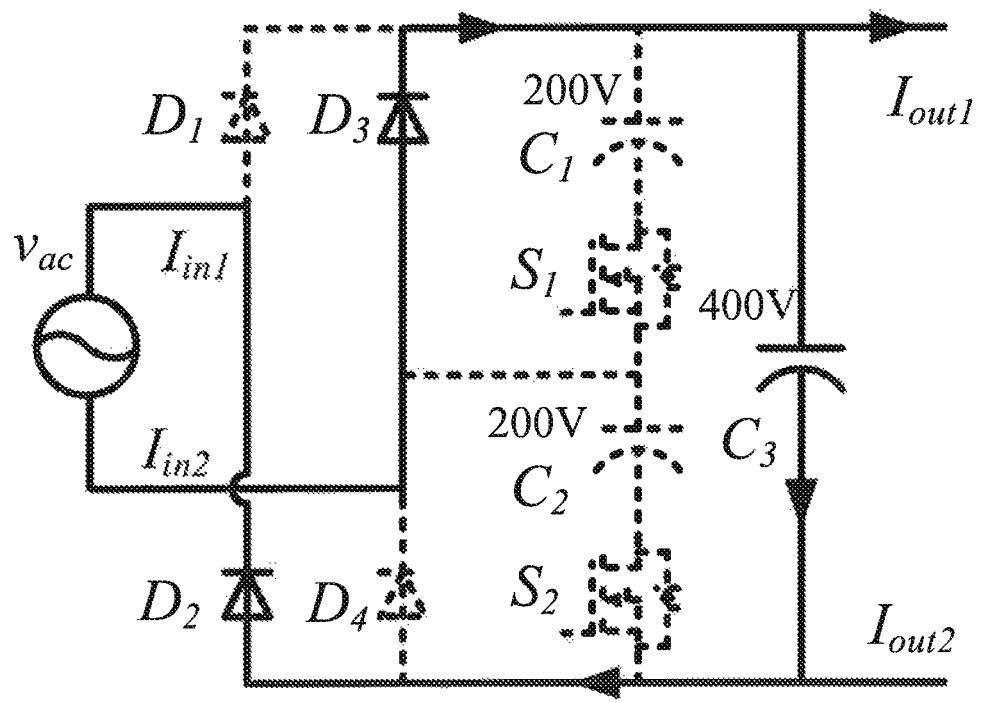
FIG. 12B is a circuit diagram showing a second operational mode of the FB-VD rectifier #2 embodiment of FIG. 8A at 220V AC input.

The operation of FB-VD rectifier #2 at 220 V AC is shown in FIGS. 12A and 12B. The capacitor $C_3$ charging processes during the positive and negative half cycles are shown in FIG. 12A and FIG. 12B, respectively. $D_1$ and $D_4$ conduct during the positive half cycle, and $D_2$ and $D_3$ for the negative half cycle.

When the rectifier is not working (i.e., when $D_1$, $D_2$, $D_3$, $D_4$ are not conducting), $C_3$ provides power for the load.

The FB-VD rectifiers #1 and #2 will be analyzed and compared with the conventional structure (FIG. 2) with loss and power density considerations.

The specifications of the conventional FB-VD rectifier and the embodiments used in the analysis are shown in Table I. The analysis was conducted at 65 W. For safety considerations, 650 V MOSFETs were used as switches in the FB-VD rectifiers. In the table, the power density was calculated based on a 65 W, 1 MHz LLC prototype of 7.5 cm (L)*3.2 cm (W)*2.2 cm (H).

TABLE I

SPECIFICATIONS OF THE FB-VD RECTIFIERS

|  | Conventional FB-VD rectifier | FB-VD rectifier #1 | FB-VD rectifier #2 |
|---|---|---|---|
| Po | 65 W | | |
| $D_1$-$D_4$ | 600 V 1 V@1 A (ES1J) | | |
| MOSFETs | 650 V 190 mOhm (IPD65R190C7) | | |
| Switch No. | 2 | 1 | 2 |
| $C_1$ | 68 µF (200 V) | 68 µF (400 V) | 47 µF (200 V) |
| $C_2$ | 68 µF (200 V) | 68 µF (200 V) | 47 µF (200 V) |
| $C_3$ | N/A | N/A | 22 µF (400 V) |
| CV product | 27,200 µF*V | 40,800 µF*V | 27,600 µF*V |
| Power density | 1.23 W/cm³ | 1.15 W/cm³ | 1.23 W/cm³ |

The loss breakdown for the three FB-VD rectifiers at 110 V and 220 V is summarized in Table II and Table III, respectively. The forward voltage drop of the input diode bridge used for the calculations was 1V. The loss angle of the electrolytic capacitor used for the calculations was 0.15, which is a commonly seen value in the vendor's datasheet. The MOSFET Rdson is as in Table I. The current stress in the components was determined from PSIM (Powersim Inc., Rockville, Md., USA) simulation.

For 110 V AC input, at which the losses are nearly doubled due to the high current, the FB-VD rectifier #1 and the FB-VD rectifier #2 had lower overall loss than the conventional FB-VD rectifier. As shown in Table II, the overall loss was reduced from almost 1 W to about 0.75 W, which is a ¼ reduction. With this, the total efficiency improves approximately 0.4% (0.25 W/65 W). It should be noted that if $D_2$ and $D_4$ are replaced with MOSFETs operating as synchronous rectifiers (SR), then the efficiency improvement will be even more significant because the conduction loss will be lower. It was observed that at 220 V operation, the three FB-VD rectifiers have similar losses (see Table III).

TABLE II

LOSS BREAKDOWN FOR FB-VD RECTIFIERS AT 110 V AC

|  | Conventional FB-VD rectifier | FB-VD rectifier #1 | FB-VD rectifier #2 |
|---|---|---|---|
| $D_1$-$D_4$ | 0.512 W | 0.512 W | 0.548 W |
| $S_1$, $S_2$ | 0.435 W | 0.218 W | 0.15 W |
| $C_1$, $C_2$ | 0.03 W | 0.03 W | 0.03 W |
| $C_3$ | N/A | N/A | 0.002 W |
| Total | 0.98 W | 0.76 W | 0.73 W |

TABLE III

LOSS BREAKDOWN FOR FB-VD RECTIFIERS AT 220 V AC

|  | Conventional FB-VD rectifier | FB-VD rectifier #1 | FB-VD rectifier #2 |
| --- | --- | --- | --- |
| $D_1$-$D_4$ | 0.474 W | 0.452 W | 0.48 W |
| $S_1$, $S_2$ | 0 W | 0.07 W | 0 W |
| $C_1$, $C_2$ | 0.017 W | 0.03 W | 0 W |
| $C_3$ | N/A | N/A | 0.02 W |
| Total | 0.49 W | 0.55 W | 0.5 W |

Figure 3B:
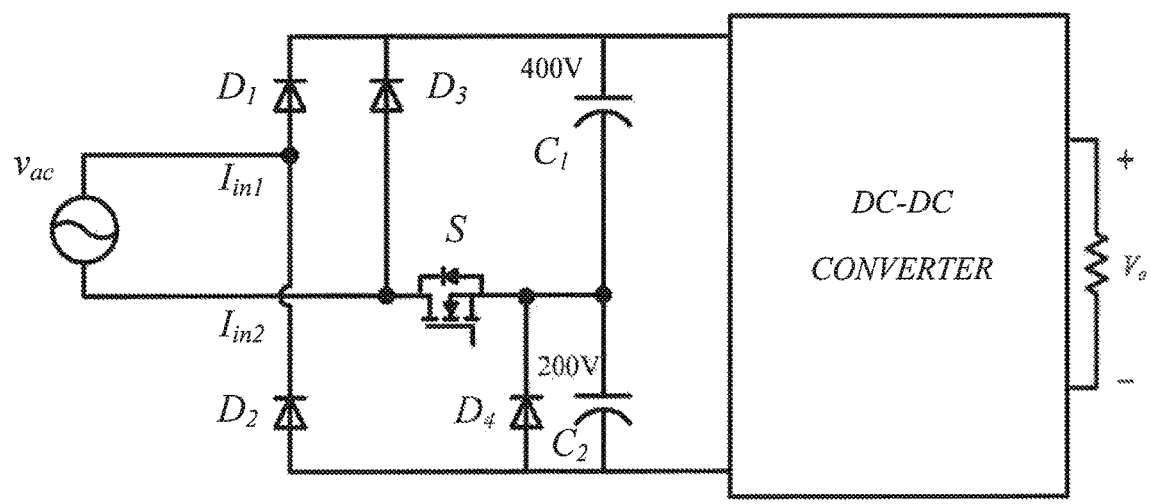
FIG. 3B is a circuit diagram of a power adapter comprising the FB-VD rectifier #1 and a DC-DC converter, according to an embodiment of the invention.
Figure 8B:
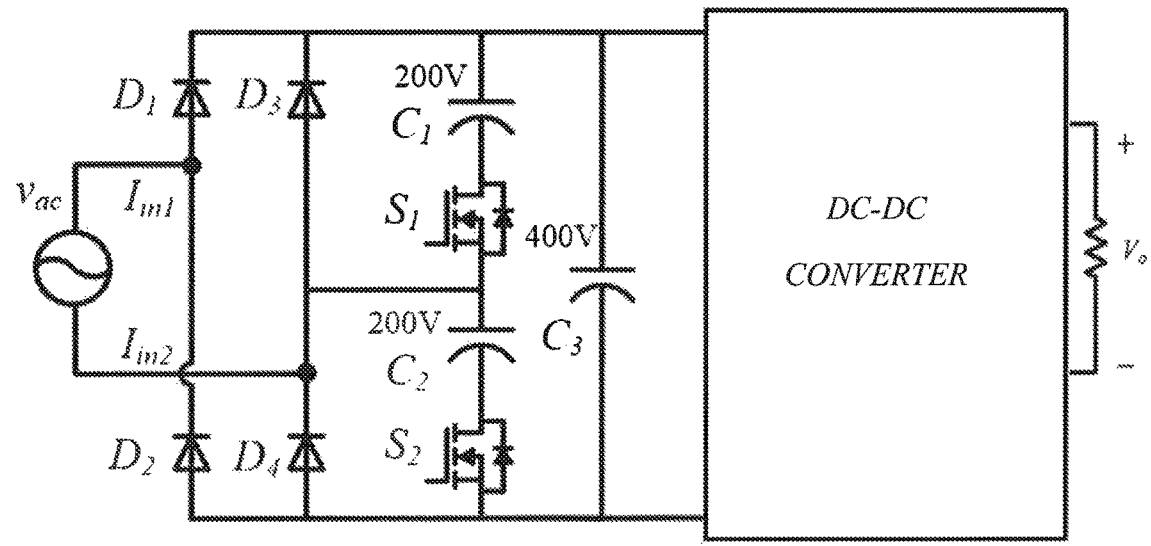
FIG. 8B is a circuit diagram of a power adapter comprising the FB-VD rectifier #2 and a DC-DC converter, according to an embodiment of the invention.

As noted above, the hybrid FB-VD rectifier embodiments may be used with DC-DC converters to achieve high efficiency, small size, and light weight in a power adapter. For example, a power adapter may comprise FB-VD rectifier #1 or FB-VD rectifier #2, and a single stage DC-DC converter, as shown in FIGS. 3B and 8B, respectively. The output terminals of the hybrid FB-VD rectifier are connected to the input terminals of the DC-DC converter.

In one embodiment, the single-stage DC-DC converter may be a LLC converter. For example, an LLC converter such as the LLC converter part of FIG. 1 may be used. Use of a hybrid rectifier reduces the operational DC input voltage range, i.e., the required voltage gain, of the LLC stage. By doing so, a large magnetizing inductor could be used to reduce both the magnetizing and the resonant current (and thus the conducting loss) in the resonant tank.

Design specifications for one such embodiment are summarized in Table IV. The maximum DC input voltage is calculated from 264 V*1.414=373 V (264 Vac=220 Vac*120%, where 120% is the generally recognized maximum fluctuation of the AC grid), at which the LLC converter should operate at the resonant frequency. Based on these criteria, the turns ratio is designed at 10:1 for 19 V output voltage.

TABLE IV

DESIGN SPECIFICATION

| Input AC Voltage | 90 V AC-264 V AC |
| --- | --- |
| Max Input DC Voltage | 373 V DC |
| Output Voltage | 19 V DC |
| Turns Ratio | 10:1 |
| Output Power | 65 W |

Figure 13:
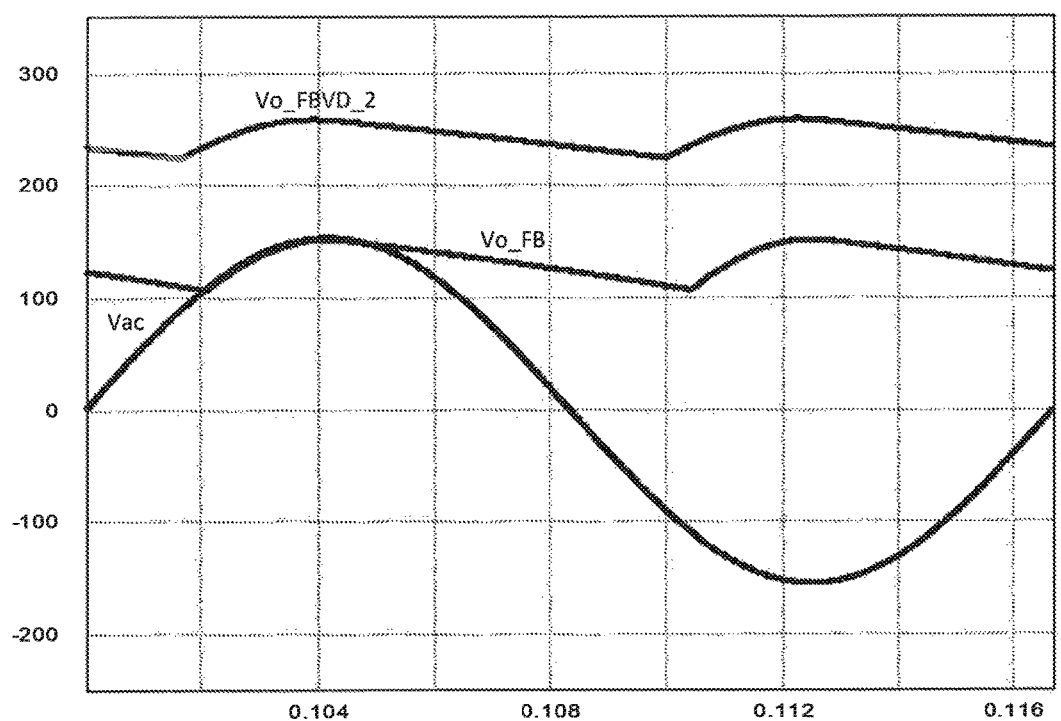
FIG. 13 shows rectified voltage waveforms of an FB-VD rectifier #2 embodiment (with $C_1=C_2=47$ μF 200 V and $C_3=22$ μF 400 V) and of a conventional full bridge (FB) rectifier (with capacitor=68 μF 400V) for 110 V 60 Hz AC input.
Figure 14:
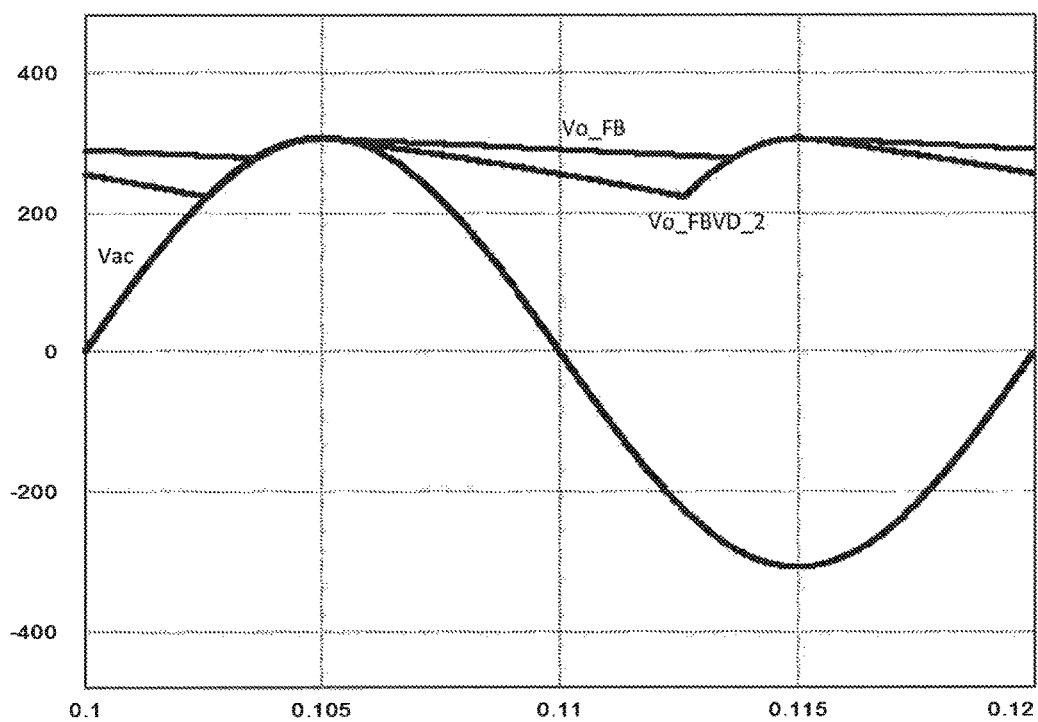
FIG. 14 shows rectified voltage waveforms of an FB-VD rectifier #2 embodiment (with $C_1=C_2=47$ μF 200 V and $C_3=22$ μF 400 V) and of a conventional FB rectifier (with capacitor=68 μF 400V) for 220 V 50 Hz AC input.

The rectified DC voltage of the FB-VD rectifier #2 is used as an example to compare with that of a full bridge rectifier (note: not the conventional FB-VD rectifier) for both 220 V, 50 Hz and 110 V, 60 Hz AC input. Results for the FB-VD rectifier #1 are expected to be similar. For the FB-VD rectifier #2, two 47 µF capacitors at 200 V rating plus one 22 µF capacitor at 400 V rating were used. For the full bridge rectifier, one 68 µF 400 V rating capacitor was used to match the CV product (size) of the capacitors used in the FB-VD rectifier #2. The rectified DC voltages of both configurations are shown in FIG. 13 and FIG. 14. In FIG. 13, the DC voltage range (Vo_FB) is from 107 V to 152 V for the full bridge rectifier. For the FB-VD rectifier #2, the DC voltage (Vo_FBVD_2) increases to between 225 V and 260 V.

In FIG. 14, the DC voltage range for the full bridge rectifier at 220 V input is very narrow, usually between 278 V and 305 V. For the FB-VD rectifier, the minimum DC voltage is about 223 V, which remains very close to that at 110 V case.

The conclusion here is that with a LLC converter comprising a FB-VD rectifier embodiment, the rectified DC voltage range is reduced significantly. It is observed that the minimum DC voltage increases from 107 V to 223 V, which means the required voltage gain for the LLC stage is reduced from 3.5 (373 V/107 V) to 1.7 (373 V/223 V).

TABLE V

LLC PARAMETER DESIGN

|  | LLC Design #1 | LLC Design #2 |
| --- | --- | --- |
| Lr | 7 µH | 7 µH |
| Cr | 2 nF | 2 nF |
| Lm | 15 µH | 35 µH |
| Gain (Vin _min) | 3.5 (107 V) | 1.7 (223 V) |

Figure 15A:
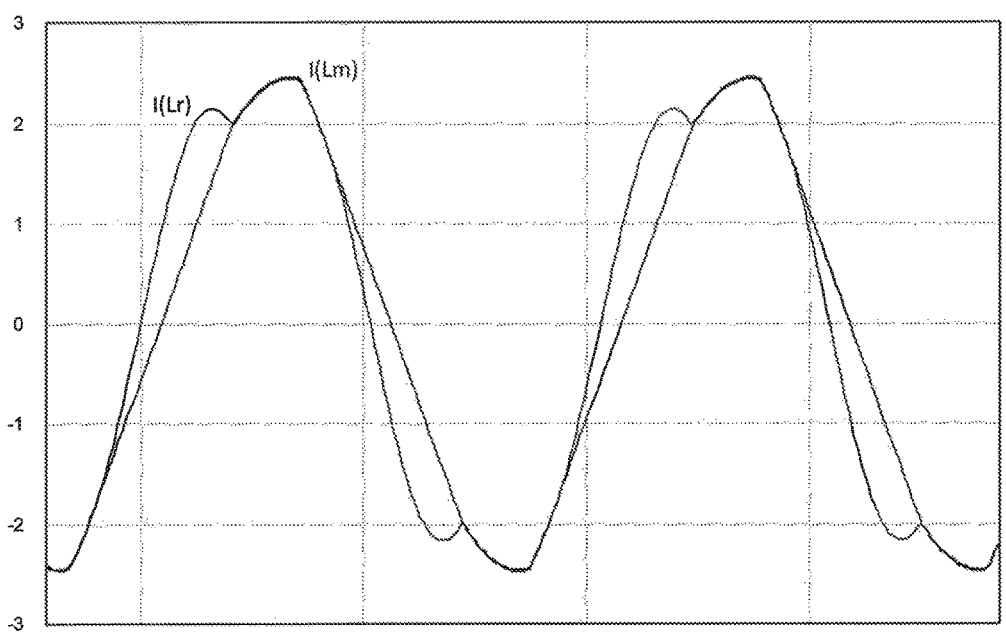
FIGS. 15A and 15B show simulated resonant current stress of two LLC converter designs with voltage gains of 3.5 and 1.7, respectively.
Figure 15B:
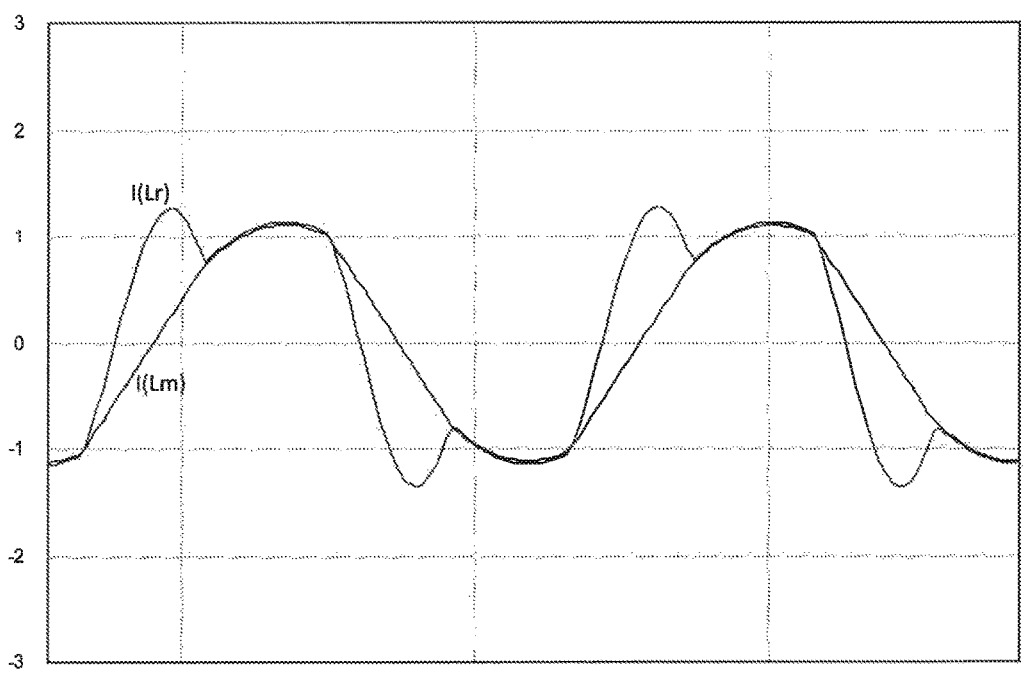

FIGS. 15A and 15B show a resonant current comparison for two LLC converter designs (LLC Design #1 and LLC Design #2) based on 107 V and 223 V minimum input. The LLC design parameters are shown in Table V. It is observed that the resonant current is reduced significantly (approximately halved) in terms of both RMS value and peak value, with the required voltage gain being reduced from 3.5 for LLC Design #1 to 1.7 for LLC Design #2. Based on these results it is suggested that the conducting loss in the half bridge (HB) switches and the transformers (with inductor integrated) is quartered.

65 W prototypes were built to verify the feasibility of the FB-VD rectifier #1 and #2 embodiments, based on the parameters given in Table IV. The design specifications of the FB-VD rectifiers shown in Table I were used. The FB-VD rectifier #1 and #2 were tested alone to generate the results in FIGS. 16-19. An LLC converter according to the LLC Design #2 parameters shown in Table V was built and tested to generate the results in FIGS. 20-22.

Figure 16:
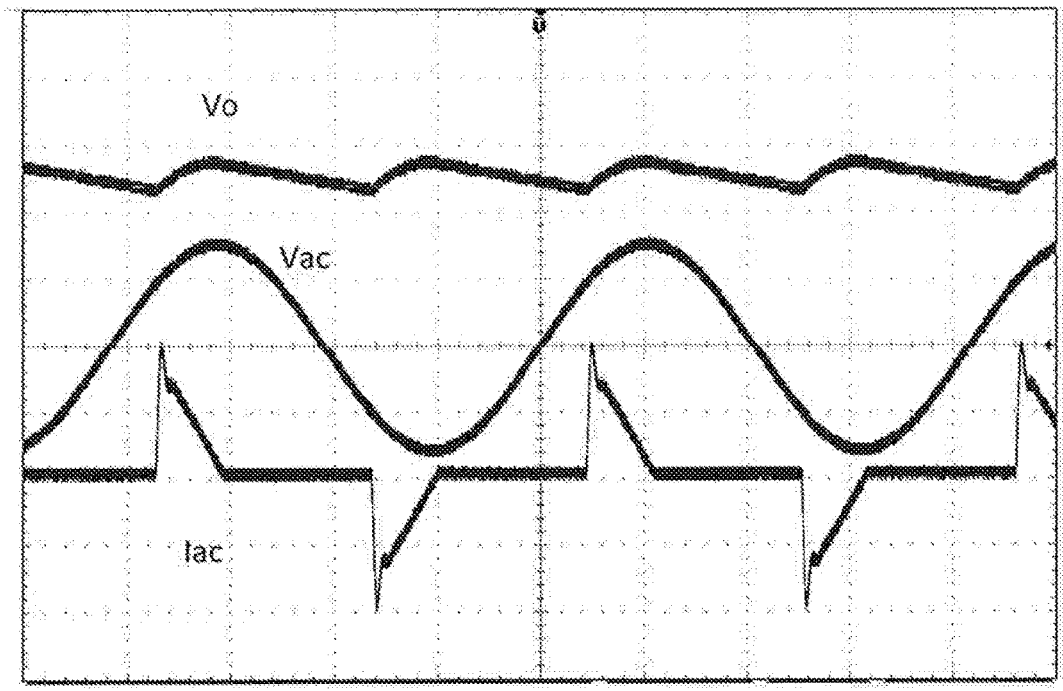
FIG. 16 shows experimental waveforms of the FB-VD rectifier #1 at 110 V 60 Hz AC input; Vac input voltage (100 V/div); Vo rectified DC voltage (100 V/div); Iac input current (2 A/div), according to an embodiment of the invention.

FIG. 16 shows the measured waveforms of the FB-VD rectifier #1 at 110 V 60 Hz AC input operation. The rectified DC voltage is from 225 V to 275 V, which agrees with the simulation results. The peak value of the input current stress is 4 A. This is somewhat higher than that from the simulation due to the impact of the parasitic components in the circuit.

Figure 17:
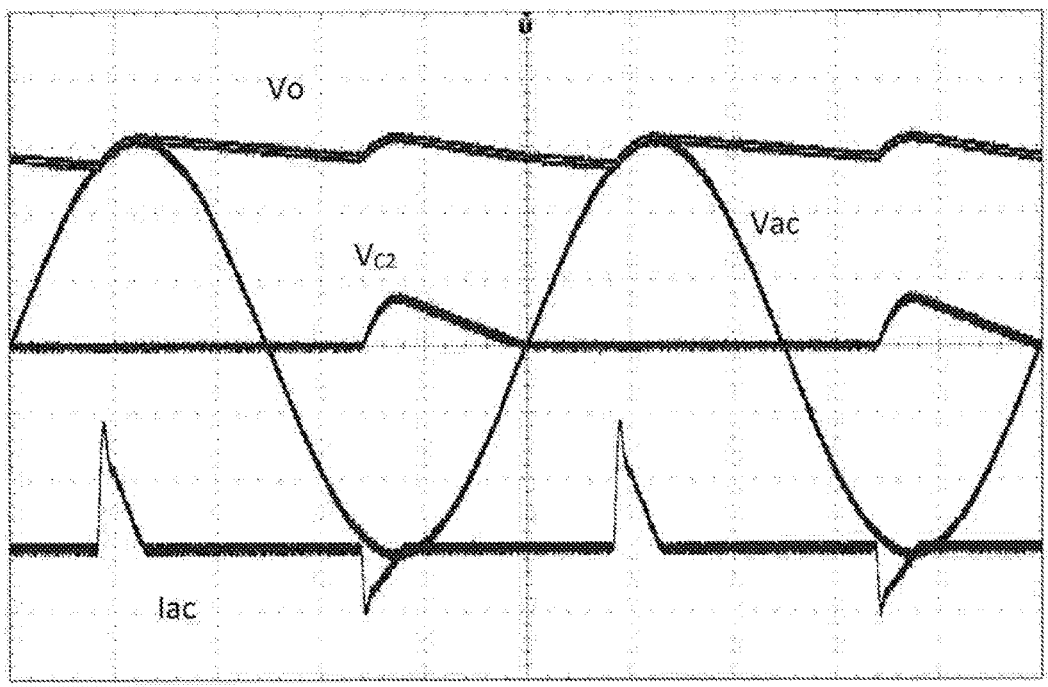
FIG. 17 shows experimental waveforms of the FB-VD rectifier #1 at 220 V 50 Hz AC input; Vac input voltage (100 V/div); Vo rectified DC voltage (100 V/div); VC2 (20 V/div); Iac input current (2 A/div), according to an embodiment of the invention.

FIG. 17 shows the measured waveforms of the FB-VD rectifier #1 at 220 V 50 Hz AC input operation. The results have very good agreement with those of the simulation. During the positive half cycle, only $C_1$ is charged. During the negative half, both $C_1$ and $C_2$ are charged. This explains the asymmetric current waveform.

Figure 18:
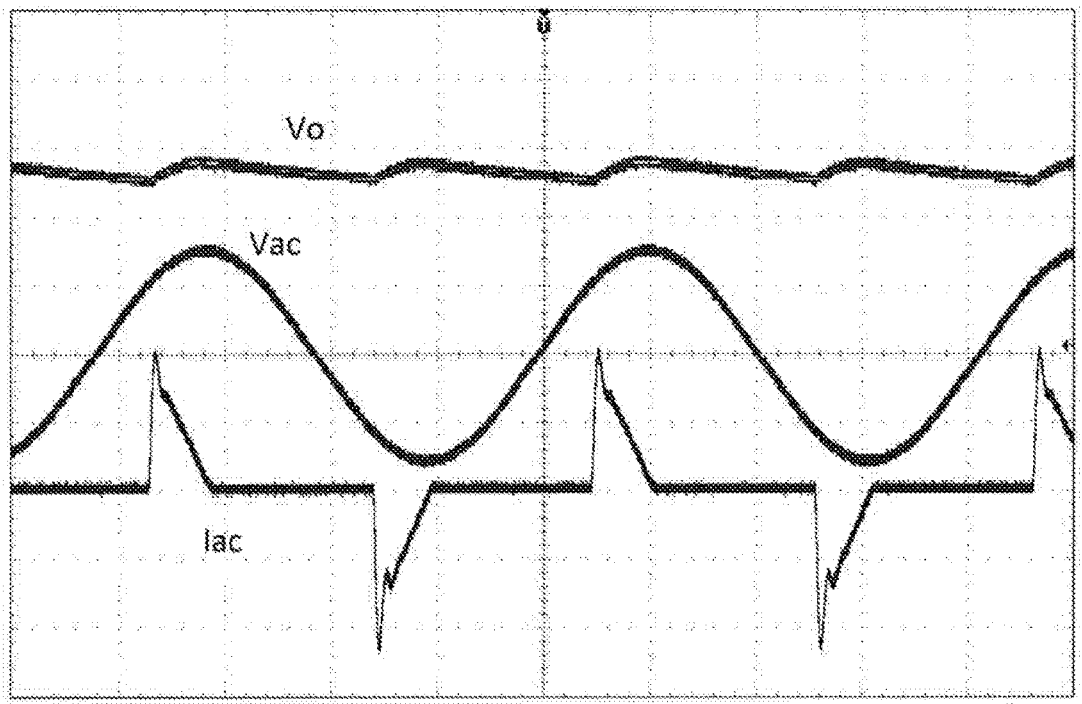
FIG. 18 shows experimental waveforms of the FB-VD rectifier #2 at 110 V 60 Hz AC input; Vac input voltage (100 V/div); Vo rectified DC voltage (100 V/div); Iac input current (2 A/div), according to an embodiment of the invention.
Figure 19:
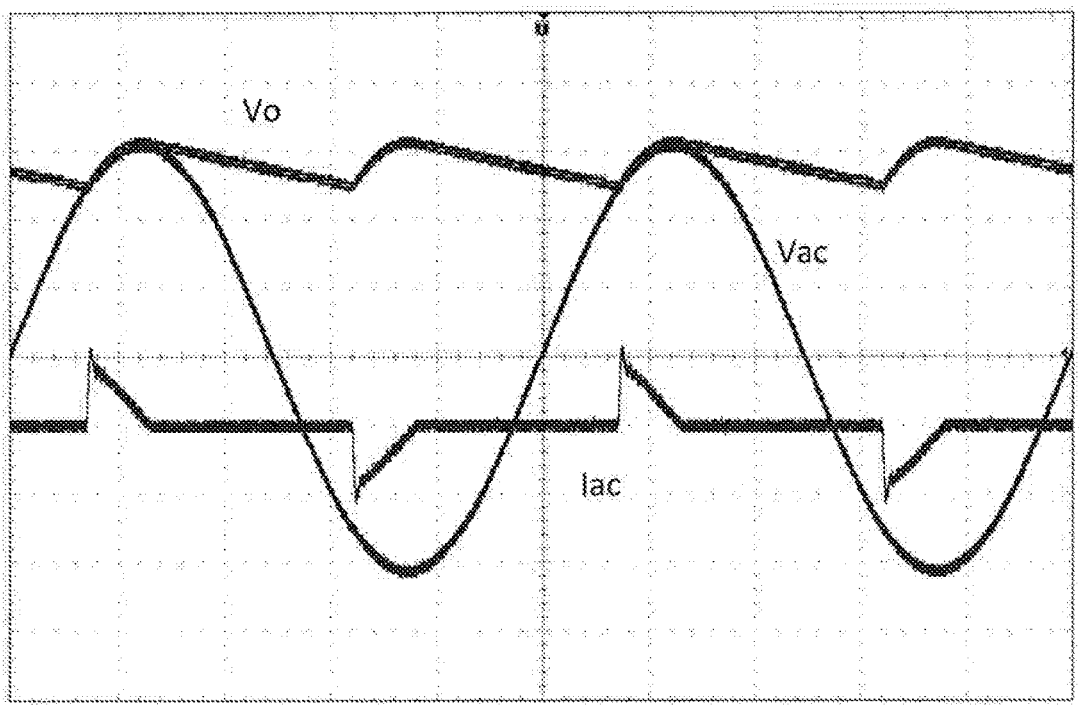
FIG. 19 shows experimental waveforms of the FB-VD rectifier #2 at 220 V 50 Hz AC input; Vac input voltage (100 V/div); Vo rectified DC voltage (100 V/div); Iac input current (2 A/div), according to an embodiment of the invention.

FIG. 18 shows the measured waveforms of the FB-VD rectifier #2 at 110 V 60 Hz AC input operation. FIG. 19 shows the waveforms of the FB-VD rectifier #2 at 220 V 50 Hz AC input operation. The results have good agreement with those of the analysis and simulation.

In practical situations, considering the losses in the power train, as well as 100 V AC input operation, the input voltage of the LLC stage should be designed to operate over an even wider voltage range. In this embodiment, the LLC stage can operate from 200 V to 370 V.

Figure 20:
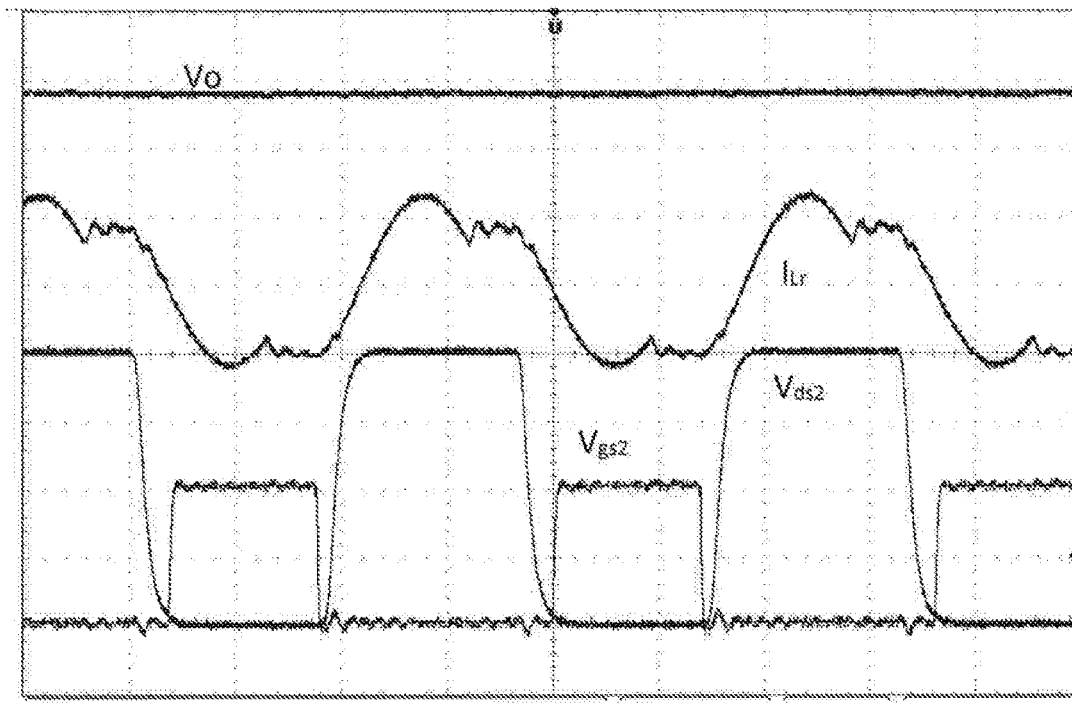
FIG. 20 shows experimental waveforms of an LLC converter at 200 V DC input voltage and 700 kHz switching frequency; Vo DC voltage (5 V/div); $V_{gs2}$ Q2 gate signal (5 V/div); Vds2 Q2 drain-source voltage (50 V/div); $I_{Lr}$ resonant current (1 A/div), according to an embodiment.

FIG. 20 shows the measured waveforms of the LLC Design #2 at 200 V DC operation. The switching frequency is 700 kHz. The resonant current is controlled below 1 A with a relatively large magnetizing inductor $L_m$ of 35 µH. As can be observed, the HB switches achieve zero voltage switching (ZVS) even at 200 V, which is the lowest input voltage.

Figure 21:
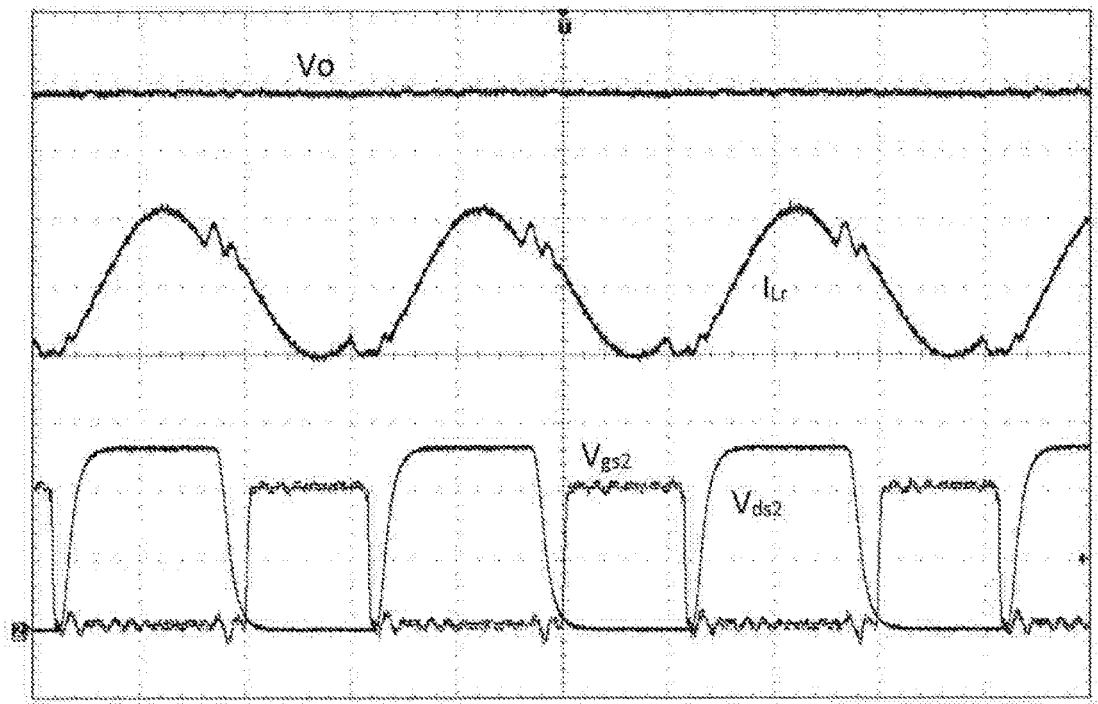
FIG. 21 shows experimental waveforms of an LLC converter at 265 V DC input voltage and 850 kHz switching frequency; Vo DC voltage (5 V/div); $V_{gs2}$ Q2 gate signal (5 V/div); Vds2 Q2 drain-source voltage (100 V/div); $I_{Lr}$ resonant current (1 A/div), according to an embodiment.

FIG. 21 shows the measured waveform of the LLC Design #2 at 265 V DC input condition. This is the generally the maximum input voltage at 110 V AC. The switching frequency is 850 kHz. The resonant tank current is 0.85 A as RMS value.

Figure 22:
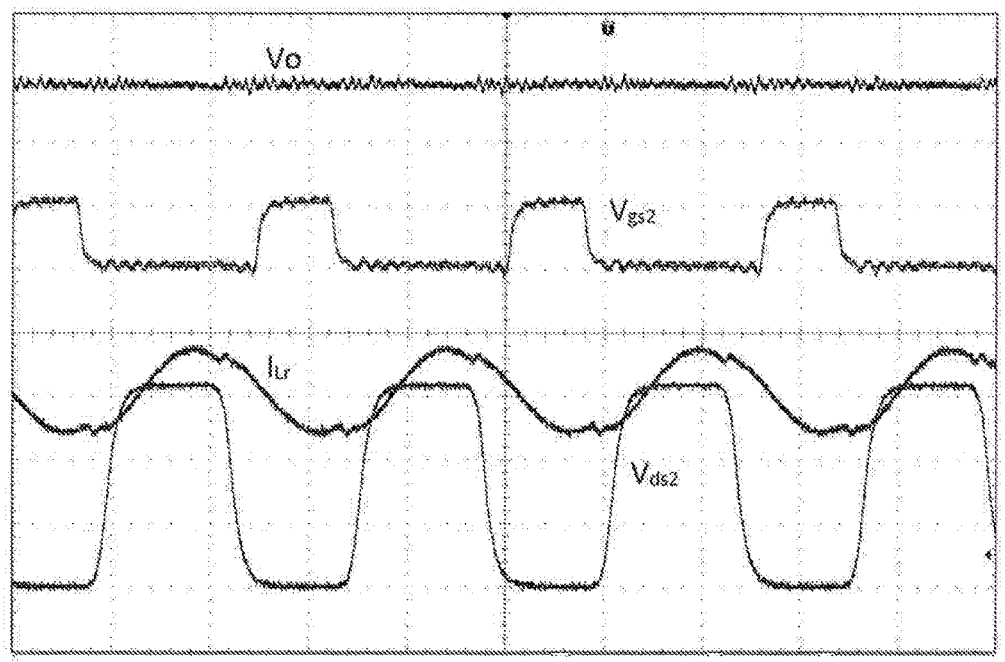
FIG. 22 shows experimental waveforms of an LLC converter at 310 V DC input voltage and 1 MHz switching frequency; Vo DC voltage (10 V/div); $V_{gs2}$ Q2 gate signal (10 V/div); Vds Q2 drain-source voltage (100 V/div); $I_{Lr}$ resonant current (1 A/div), according to an embodiment.

FIG. 22 shows the measured waveform of the LLC Design #2 at 310 V DC input condition, which is the maximum voltage at 220 V AC input. The switching frequency reaches 1 MHz. The resonant tank current is 0.75 A as RMS value, and ZVS operation can be achieved.

It is noted that the waveforms of FIGS. 20-22 are not in the same time scale (400 ns/div) as the waveforms of FIGS. 16-19 (4 ms/div).

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed is:

1. A hybrid full bridge-voltage doubler (FB-VD) rectifier, comprising:
   first and second AC input terminals;
   first and second DC output terminals;
   a plurality of diodes;
   a first switch connected in series with a first capacitor;
   a second switch connected in series with a second capacitor;
   a third capacitor connected between the first and second DC output terminals;
   wherein, for a low AC input voltage, the hybrid FB-VD rectifier operates according to at least first, second, and third working modes, the first working mode corresponding to a positive half cycle of the AC input voltage and including the first switch conducting to charge the first capacitor and the second switch conducting to charge third capacitor, and the second capacitor discharging; the second working mode corresponding to a negative half cycle of the AC input voltage and including the second switch conducting to charge the second capacitor and the first switch conducting to charge third capacitor, and the first capacitor discharging; and the third working mode including the first and second switches conducting and the first, second, and third capacitors discharging;
   wherein, for a high AC input voltage, the first switch and the second switch are not active and only the third capacitor is charged and discharged.

2. The hybrid FB-VD rectifier of claim 1, wherein the low AC input voltage is an AC utility of about 90-150 V AC, and the high AC input voltage is an AC utility of about 200-280 V AC.

3. The hybrid FB-VD rectifier of claim 2, wherein the first capacitor and the second capacitor are 200 V rating capacitors and the third capacitor is a 400 V rating capacitor.

4. The hybrid FB-VD rectifier of claim 2, wherein the first capacitor and the second capacitor are 47 µF and the third capacitor is 22 µF.

5. The hybrid FB-VD rectifier of claim 1, comprising:
   first, second, third, and fourth diodes;
   wherein a positive terminal of the first diode is connected to both a negative terminal of the second diode and the first AC input terminal; a negative terminal of the first diode is connected to both a negative terminal of the third diode and a positive terminal of the first capacitor; a positive terminal of the third diode is connected to both the second AC put terminal and a second terminal of the first switch; a positive terminal of the second diode is connected to both a positive terminal of the fourth diode and a second terminal of the second switch; a negative terminal of the fourth diode is connected to the positive terminal of the third diode; a negative terminal of the first capacitor is connected to a first terminal of the first switch; a second terminal of the first switch is connected to a positive terminal of the second capacitor; a negative terminal of the second capacitor is connected to a first terminal of the second switch; a positive terminal of the third capacitor is connected to both the first DC output terminal and a positive terminal of the first capacitor, and a negative terminal of the third capacitor is connected to both the second DC output terminal and the second terminal of the second switch.

6. The hybrid FB-VD rectifier of claim 5, wherein the first, second, third, and fourth diodes are 600 V, 1 A and the first and second switches are 650 V, 190 mOhm MOSFETs.

7. The hybrid FB-VD rectifier of claim 1, wherein the first capacitor and the second capacitor are of the same value in F.

8. A power supply comprising the hybrid FB-VD rectifier of claim 1, and a LLC converter.

9. The power supply of claim 8, wherein the low AC input voltage is an AC utility of about 90-150 V AC, and the high AC input voltage is an AC utility of about 200-280 V AC.

10. The power supply of claim 9, wherein the LLC converter is a single stage LLC converter comprising a transformer with a turns ratio of ten.

11. The power supply of claim 8, for use with a portable electronic device.

12. A method for implementing a hybrid full bridge-voltage doubler (FB-VD) rectifier, comprising:
    providing, for the hybrid FB-VD rectifier:
    first and second AC input terminals;
    first and second DC output terminals;
    a plurality of diodes;
    a first switch connected in series with a first capacitor;
    a second switch connected in series with a second capacitor;
    a third capacitor connected between the first and second DC output terminals;
    the method further comprising:
    for a low AC input voltage, operating the hybrid FB-VD rectifier according to at least first, second, and third working modes, the first working mode corresponding to a positive half cycle of the AC input voltage and including the first switch conducting to charge the first capacitor and the second switch conducting to charge third capacitor, and the second capacitor discharging; the second working mode corresponding to a negative half cycle of the AC input voltage and including the second switch conducting to charge the second capacitor and the first switch conducting to charge third capacitor, and the first capacitor discharging; and the third working mode including the first and second switches conducting and the first, second, and third capacitors discharging;
    for a high AC input voltage, operating the hybrid FB-VD rectifier such that the first switch and the second switch are not active and only the third capacitor is charged and discharged.

13. The method of claim 12, wherein the low AC input voltage is an AC utility of about 90-150 V AC, and the high AC input voltage is an AC utility of about 200-280 V AC.

14. The method of claim 13, wherein the first capacitor and the second capacitor are 200 V rating capacitors and the third capacitor is a 400 V rating capacitor.

15. The method of claim 13, wherein the first capacitor and the second capacitor are 47 µF and the third capacitor is 22 µF.

16. The method of claim 12, comprising implementing the hybrid FB-VD rectifier using first, second, third, and fourth diodes;

wherein a positive terminal of the first diode is connected to both a negative terminal of the second diode and the first AC input terminal; a negative terminal of the first diode is connected to both a negative terminal of the third diode and a positive terminal of the first capacitor; a positive terminal of the third diode is connected to both the second AC input terminal and a second terminal of the first switch; a positive terminal of the second diode is connected to both a positive terminal of the fourth diode and a second terminal of the second switch; a negative terminal of the fourth diode is connected to the positive terminal of the third diode; a negative terminal of the first capacitor is connected to a first terminal of the first switch; a second terminal of the first switch is connected to a positive terminal of the second capacitor; a negative terminal of the second capacitor is connected to a first terminal of the second switch; a positive terminal of the third capacitor is connected to both the first DC output terminal and a positive terminal of the first capacitor, and a negative terminal of the third capacitor is connected to both the second DC output terminal and the second terminal of the second switch.

17. The method of claim 16, wherein the first, second, third, and fourth diodes are 600 V, 1 A and the first and second switches are 650 V, 190 mOhm MOSFETs.

18. The method of claim 12, wherein the first capacitor and the second capacitor are of the same value in µF.

19. The method of claim 12, further comprising implementing the hybrid FB-VD rectifier together with a LLC converter in a power supply.

20. The method of claim 19, wherein the low AC input voltage is an AC utility of about 90-150 V AC, and the high AC input voltage is an AC utility of about 200-280 V AC.

21. The method of claim 20, wherein the LLC converter is a single stage LLC converter comprising a transformer with a turns ratio of ten.

22. The method of claim 19, wherein the power supply is for use with a portable electronic device.

* * * * *